United States Patent
Thaller et al.

(10) Patent No.: US 11,373,368 B2
(45) Date of Patent: Jun. 28, 2022

(54) REALITY-BASED THREE-DIMENSIONAL INFRASTRUCTURE RECONSTRUCTION

(71) Applicant: Bongfis GmbH, Graz (AT)

(72) Inventors: Wolfgang Thaller, Graz (AT); Thomas Richter-Trummer, Graz (AT); Michael Putz, Graz (AT); Richard Maierhofer, Frohnleiten (AT)

(73) Assignee: BLACKSHARK.AI GMBH, Graz (AT)

( * ) Notice: Subject to any disclaimer, the term of this patent is extended or adjusted under 35 U.S.C. 154(b) by 148 days.

(21) Appl. No.: 16/825,860

(22) Filed: Mar. 20, 2020

(65) Prior Publication Data

US 2021/0082183 A1 Mar. 18, 2021

Related U.S. Application Data

(62) Division of application No. 16/570,639, filed on Sep. 13, 2019, now Pat. No. 10,636,209.

(51) Int. Cl.
*G06T 15/10* (2011.01)
*G06T 17/20* (2006.01)
(Continued)

(52) U.S. Cl.
CPC ............... *G06T 17/20* (2013.01); *G06F 8/44* (2013.01); *G06F 8/60* (2013.01); *G06T 3/0031* (2013.01);
(Continued)

(58) Field of Classification Search
CPC ................................ G06T 17/00; A63F 13/00
See application file for complete search history.

(56) References Cited

U.S. PATENT DOCUMENTS 10,636,209 B1 4/2020 Thaller
2011/0269540 A1* 11/2011 Gillo ..................... A63F 13/35
463/31
(Continued)

FOREIGN PATENT DOCUMENTS

EP 1170699 A2 * 1/2002 ............. G06T 15/20
WO 2017/029679 2/2017

OTHER PUBLICATIONS

International Society for Photogrammetry 2D Smantic labeling contest, 2019.
(Continued)

*Primary Examiner* — Weiming He
(74) *Attorney, Agent, or Firm* — Beyer Law Group LLP

(57) ABSTRACT

Two-dimensional aerial images and other geo-spatial information are processed to produce land classification data, vector data and attribute data for buildings found within the images. This data is stored upon a server computer within shape files, and also stored are source code scripts describing how to reconstruct a type of building along with compiled versions of the scripts. A software game or simulator executes upon a client computer in which an avatar moves within a landscape. A classifier classifies a type of building in the shape file to execute the appropriate script. Depending upon its location, a scene composer downloads a shape file and a compiled script is executed in order to reconstruct any number of buildings in the vicinity of the avatar. The script produces a three-dimensional textured mesh which is then rendered upon a screen of the client computer to display a two-dimensional representation of the building.

19 Claims, 17 Drawing Sheets

Components of 3-D Reconstruction System

(51) Int. Cl.
  *G06F 8/60* (2018.01)
  *G06F 8/41* (2018.01)
  *G06T 3/00* (2006.01)
  *H04L 67/06* (2022.01)
  *H04L 67/52* (2022.01)
  *H04L 67/131* (2022.01)

(52) U.S. Cl.
  CPC ............ *H04L 67/06* (2013.01); *H04L 67/131* (2022.05); *H04L 67/52* (2022.05)

(56) References Cited

U.S. PATENT DOCUMENTS

| | | | |
|---|---|---|---|
| 2013/0095927 A1* | 4/2013 | Rietman | A63F 13/63 463/42 |
| 2013/0321392 A1* | 12/2013 | van der Merwe | G06T 17/10 345/419 |
| 2016/0342862 A1 | 11/2016 | Liu et al. | |
| 2017/0287111 A1 | 10/2017 | Makinen et al. | |
| 2018/0239514 A1 | 8/2018 | Vats | |
| 2020/0258174 A1* | 8/2020 | Rodriguez | G06Q 50/163 |

OTHER PUBLICATIONS

Haubenwallner, ShapeGenetics Using Genetic Algorithms for Procedural Modeling vol. 36, 2017.
Steinberger_Whippietree_Task_based_Scheduling_of_Dynamic_Workloads_on_the_GPU_2014.
Pedro Boechat Representing and Scheduling Procedural Generation using Operator Graphs, 2016.
Markus Steinberger, vol. 33, Parallel Generation of Architecture on the GPU, 2014.
Haala and Kada, ISPRS Journal of Photogrammetry and Remote Sensing, 2010.
Mayer, Object extraction in photogrammetric computer vision, 2008.
Yang, Rottensteiner, Heipke Classification of Land Cover and Land Use Based on Convolutional Neural Networks, vol. IV-3, 2018.
Procedual Geometry Geneator MS, Bongfish, 2016.
Thaller et al.; U.S. Appl. No. 16/570,639, filed Sep. 13, 2019.
International Search Report for Application No. PCT/IB2020/058109, dated Jul. 10, 2020.
Written Opinion of the International Search Report for Application No. PCT/IB2020/058109, dated Jul. 10, 2020.

* cited by examiner

3-D Reconstruction System

Reconstruction System

Components of 3-D Reconstruction System

Workload Management

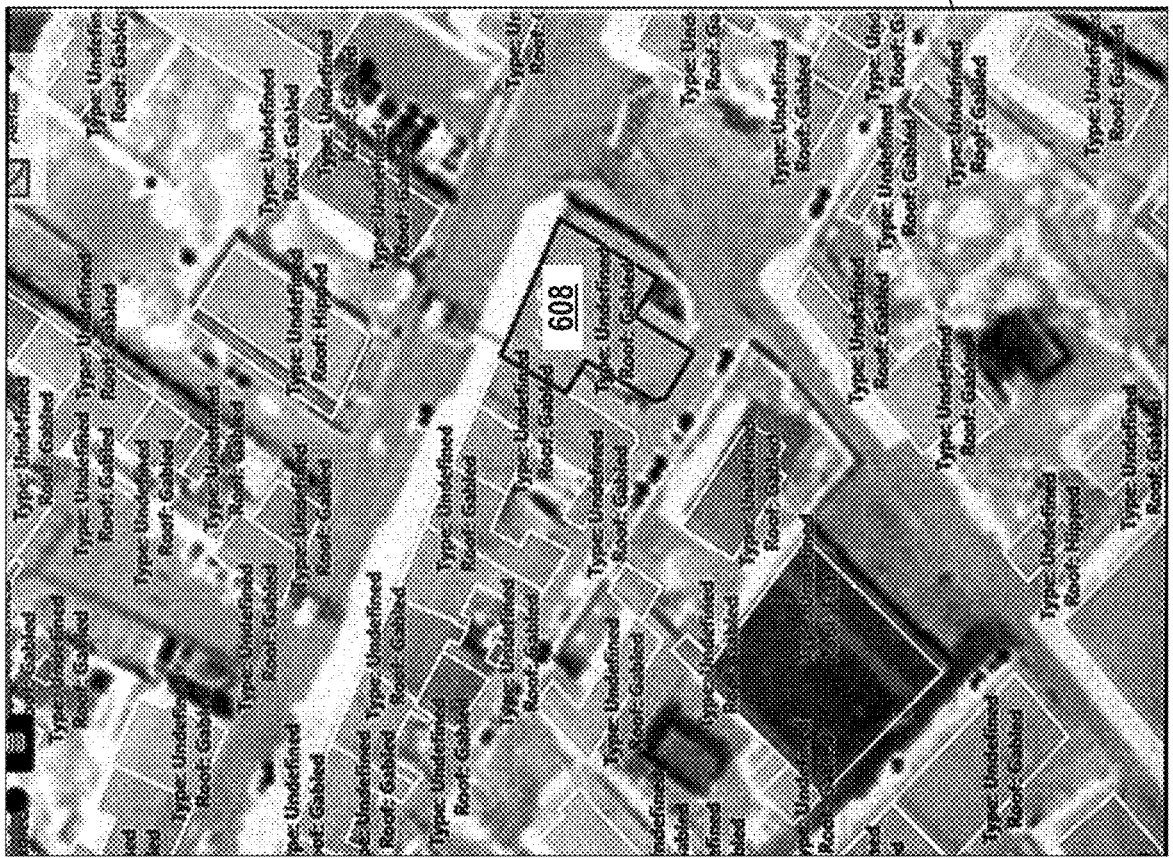
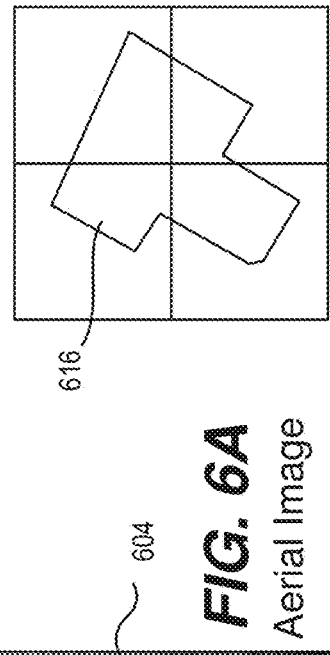
FIG. 6A
Aerial Image
FIG. 6B
Instance Data
FIG. 6C
Footprint

```
24                                                              620
25   Start:
26       Set_Size( )
27       Let(Input.building_levels = Input.lod+1)
28       Building(floor_height=floor_height)
29       {
30          Roof:
31              RoofLogic;
32          Wall:
33              WallLogic;
34       };
35
36   Building(float floor_height) {Wall; Roof;}:
37       Extrude(Input.building_levels * floor_height) —— 624
38       CompSplit( ) —— 628
39       {
40          top: Roof;
41          mantle: Wall;
42          bottom: Discard;
43       };
44
45   WallLogic:
46       DrawTexture("test/test_02") —— 632
47       Generate; —— 634
48
49   RoofLogic:
50       If (shapeArea >= 450)
51           DrawTexture("test/test_02") Generate
52       Else
53           RoofGableOverhand(0.4, -0.4) —— 636
54           {
55               top: DrawTexture("test/test_02") Generate;
56               mantle: WallLogic;
57           };
```

FIG. 6D
Sub-urban
House Script

Three-dimensional Sub-urban House

Windows Generated with Texture Grid

Windows Generated with Function

```
18
19
20    WindowGrid:
21        SimpleGrid1(4, 0, window_select( ))
22        Generate;
23
24
25    WindowSplit:
26        SubDiv(+X)  {
27            4:DrawTexture("window/window_eu_city_1") Generate;
28            4:DrawTexture("window/window_eu_city_1") Generate;
29            4:DrawTexture("window/window_eu_city_1") Generate;
30            4:DrawTexture("window/window_eu_city_1") Generate;
31        };
```

864 → lines 20–22
866 → line 25

FIG. 9C

Code to Generate Windows

```
341   Garagefloor:
342      Extrude(floor_height)
343      If (Input.lod < 2)
344         CompSplit( ) {
345            top: RoofTopColor;
346            mantle: GroundFloorWall Generate;
347            bottom: Discard;
348         }
349      Else
350         CompSplit( ) {
351            top: RoofGarageDecider;
352            mantle:
353               GroundFloorWall
354               ChooseFirstPath( ) {
355                  isFront(originalSide): FacadeFrontGarage;
356                  isSide(originalSide): FacadeGarageDecider;
357                  isBack(originalSide): FacadeGarageDecider;
358                  true: FacadeWall;
359               };
360            bottom: Discard;
361         };
```

*FIG. 10A*

Level of Detail Example

Level of Detail Example

Level of Detail Example

REALITY-BASED THREE-DIMENSIONAL INFRASTRUCTURE RECONSTRUCTION

This application is a divisional of U.S. patent application Ser. No. 16/570,639 filed Sep. 13, 2019, entitled "REALITY-BASED THREE-DIMENSIONAL INFRASTRUCTURE RECONSTRUCTION," which is hereby incorporated by reference.

FIELD OF THE INVENTION

The present invention relates generally to rendering a three-dimensional environment on a computer. More specifically, the present invention relates to reconstructing three-dimensional infrastructure on a client computer before rendering.

BACKGROUND OF THE INVENTION

In general, rendering three-dimensional infrastructure (such as buildings) based upon two-dimensional aerial images and other geo-spatial information, and displaying that infrastructure on a computer (whether in a simulator, game or other) is challenging. In particular, streaming such three-dimensional geometric data in real time to the rendering engine of a simulator or game on a computer is problematic. Prior art approaches generate large databases of geometric data that cannot realistically be streamed to a client computer in real time during execution of a simulator or game on the client computer.

In short, there is not enough memory space on a client computer that is executing the rendering engine to save a holistic global data set of geometric data representing buildings, land use classifications, cultural variations of infrastructure, etc. Various products are able to create three-dimensional urban scenes, but their requirements for memory space and processing time are excessive and these products cannot be executed at run-time speed.

What is desirable is a technique that can reconstruct infrastructure in real time on a client computer without having access to full scene-specific data. One must also take into account available bandwidth and the actual performance of the application, simulator or game on the client computer.

SUMMARY OF THE INVENTION

To achieve the foregoing, and in accordance with the purpose of the present invention, a technique is disclosed that generates three-dimensional urban infrastructure geometric data for reconstruction and rendering at run-time speed in a software application on a client computer.

Several geographical and morphological data sets may be used as source data, including: GIS, DEM (digital elevation model), land classifications or TIN data (triangulated irregular network). These data sets (self-generated or from third parties) are utilized in the pre-processing phase on a server computer to produce shape files (containing footprints, parameters, attributes, etc.) that are processed in an infrastructure reconstruction module on the client computer to generate geometry data. Other source files contain information on the height of objects for certain geographic areas (e.g., an industrial zone, city center or suburban). Prior art products typically only use footprints and heights of buildings, and do not take into account other rich attributes of buildings (such as roof type) or the cultural context of a region or its land use. Separately, also on the server computer, a script compiler transpiles predefined scripts describing building types into C++ source code and then compiles that into machine language for the reconstruction module. The server computer also provides the module with materials (textures and objects).

The reconstruction module for the actual generation of the geometry data may be embedded within a rendering engine on the client computer and create output for a software application for display in real time. Depending on the geographic position of the user of the application, his field-of-view and velocity, a scene composer defines the area that will be reconstructed. A classifier coordinates the appropriate object shapes, scripts and materials that are fed into a grammar processor that outputs the geometry data for a building or buildings.

Numerous predefined geometric functions and numerous texture-grid configurations are used in a script file to generate geometry data for a specific infrastructure on the client computer in real time. Depending upon the level of detail of a building, for example, the underling grammar can be split, meaning that there is the possibility to increase the detail density (e.g., the number of features of a façade according to the perspective of the viewer). The generator also provides a great level of variation for the objects. Thus, a plausible reconstruction of a row of houses of the same type can be generated by mixing various features for the same kind of building. The grammar processor provides scalable geometry data for scenes at run-time speed for a specific geographical area. The geometry data and vertex metadata are then fed to a GPU on the client computer through compatible buffer files which are then rendered on the client computer.

The technique provides numerous advantages. Prior art techniques are generally of two kinds. One prior technique downloads all three-dimensional geometry data from a server computer to a client computer before a simulator or game begins, so that during the game or simulator the geometry data can be rendered on the client computer. No downloading from the server computer is necessary using this technique, but bandwidth requirements can be quite high as is the memory space required on the client computer (and the scene size is limited by memory constraints).

A second prior art technique performs server-side rendering using the three-dimensional geometry data, and then downloads this data to the client computer by streaming rendered two-dimensional images to the client computer. This technique is disadvantageous because it requires high bandwidth for the transmission of complex geometries. Server-side rendering does not download any geometry, just the final rendered two-dimensional image. Disadvantages also include: high latency (user input to screen output), high bandwidth demands dependent on the screen resolution, compression artifacts, and high server load (render a scene for each connected client). Another prior art approach streams final three-dimensional geometry to a client (such as Google Earth, mentioned below), but the disadvantages are high bandwidth, compression artifacts, and limited detail.

By contrast, the present invention downloads metadata content in real time from the server computer to the client computer in order to reconstruct a scene including one or more structures such as buildings. In other words, the present invention streams data describing a scene, along with script programs describing how to reconstruct buildings, in order to reconstruct those buildings in real time on the client computer on demand More specifically, the present invention generates geometry data on the client computer to be input into the rendering engine in real time. It provides complex data from the server computer that has low bandwidth requirements between the server computer and client computer. In other words, since all geometries are generated by utilizing scripts on the client computer, the actual information that needs to be streamed is very low. The information is not actually "geometry," but is input that triggers the reconstruction of geometry data.

This technique enables the reconstruction of structures with minimal memory requirements on the client computer in comparison to the memory size of the original source material (aerial footage by satellites or fly-by images). The reconstruction module also has access to a global building script library that contains region- and culture-specific infrastructure templates of buildings, information on the land use of a geographic area, demographic density, etc. The reconstruction module can also operate with limited or sparse data sets, can fill in blank spots in the source material and determine geometry data for areas that have no or partial information, and can generate large scale urban scenes at run-time speed. The invention can reconstruct buildings on a large scale at run-time speed, such as whole cities and urban scenes. The invention is also capable of reconstructing buildings on a planet scale, that is, the viewer can virtually fly around the entire earth and have every registered building be reconstructed once it is close enough.

Further, the invention can be transferred and adapted to a variety of software applications such as training simulators, simulator games, video games, etc. The invention may be used to generate real-time content for other simulations, virtual test environments or implemented in a rendering pipeline to create reality-based environments for test scenarios (such as for autonomous AI-based systems). Furthermore, the invention may be the basis for other services; for example, future AR/VR applications may utilize the technology to generate real-time geometry data with accurate spatial distribution.

BRIEF DESCRIPTION OF THE DRAWINGS

The invention, together with further advantages thereof, may best be understood by reference to the following description taken in conjunction with the accompanying drawings in which:

FIG. 6A is a two-dimensional aerial image of a suburban town in western France.

FIG. 6B is instance data 612 associated with a house and includes attributes.

FIG. 6C shows a footprint of the house which has been obtained from the aerial image.

FIG. 6D is an example of a suburban house script written in a domain specific language (DSL).

FIG. 9C shows code for the texture grid and code for the split function.

FIG. 10A is a portion of a script for a garage of a house.

DETAILED DESCRIPTION OF THE INVENTION

Figure 1:
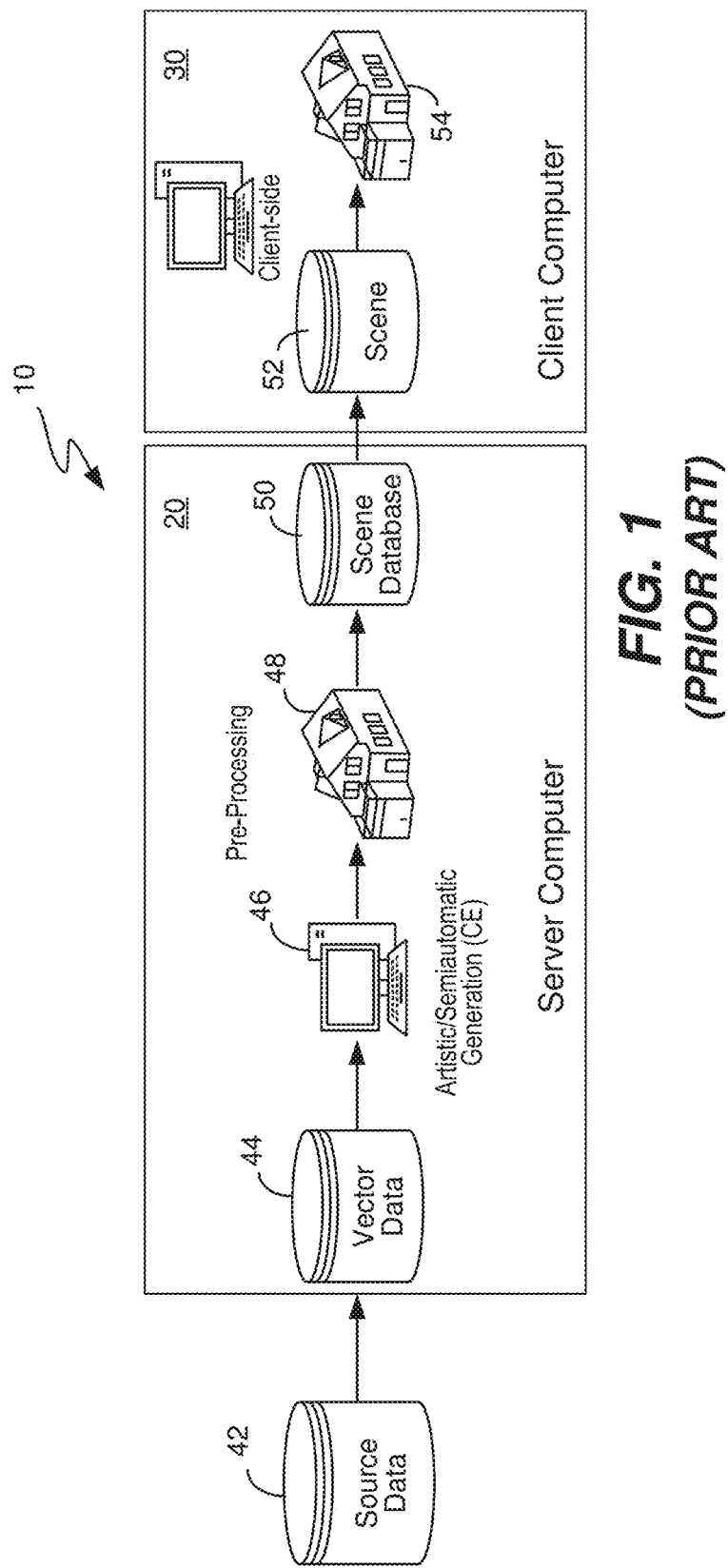
FIG. 1 illustrates a prior art system for rendering a three-dimensional environment on a client computer.

FIG. 1 illustrates a prior art system 10 for rendering a three-dimensional environment on a client computer 30. Source data 42 is delivered to a server computer 20 in the form of vector data 44. A software engineer takes the vector data and using a semi-automatic process, generates on a computer 46 a 3-D representation of a building 48 (for example) which is stored in a scene database 50 in association with the server computer 20.

Source data 42 is typically vector data only (such as GIS data), but may also include two-dimensional aerial images, which are used as is to generate a building 48. When vector data is used, it is typically only a building footprint and a height. One example is the modeling software "City Engine," available from Esri R&D Center, which uses such vector data to model a 3-D city. The output are buildings and other infrastructure of a city which are stored in scene database 50 in preparation for downloading to a client computer in real time as needed. The output may be stored in glTF (GL Transmission Format) which is a file format for 3-D scenes and models that uses the JSON standard. As known in the art, a 3-D model is a mathematical representation of a surface of an object, inanimate or living, in three dimensions. The 3-D model can be displayed as a two-dimensional image on a computer using a 3-D rendering engine. A 3-D scene may include any number of 3-D models such as buildings, landscape, roads, people, an entire city block, and other objects such as bridges, churches, industrial zones, trees, etc. The 3-D model may also be described as a 3-D textured mesh, the absolute data, or the entire geometry data of an object needed to display it in a rendering engine on the client computer.

Generation of 3-D models and scenes on the server computer and then downloading them to a client computer can be disadvantageous. For one, a texture mesh for a 3-D model is quite large; lack of sufficient bandwidth either prevents proper downloading or requires changes in the model. Compression may be used on the 3-D model (such as is done with Google Earth), but, this means that the downloaded 3-D model is of lower quality. A second problem is scalability. Because the 3-D model may have limited data (because of insufficient bandwidth), one cannot zoom in to see more detail; if one zooms in too much all that is visible are triangles, not more detail of a building. This problem of scalability exists because what is being downloaded from server 20 to computer 30 is the actual 3-D model, not a description of the 3-D model. By contrast, the present invention downloads metadata and computer code that describes how to reconstruct a 3-D model, thus requiring much lower bandwidth and providing better scalability.

Reconstruction System Block Diagram

Figure 2:
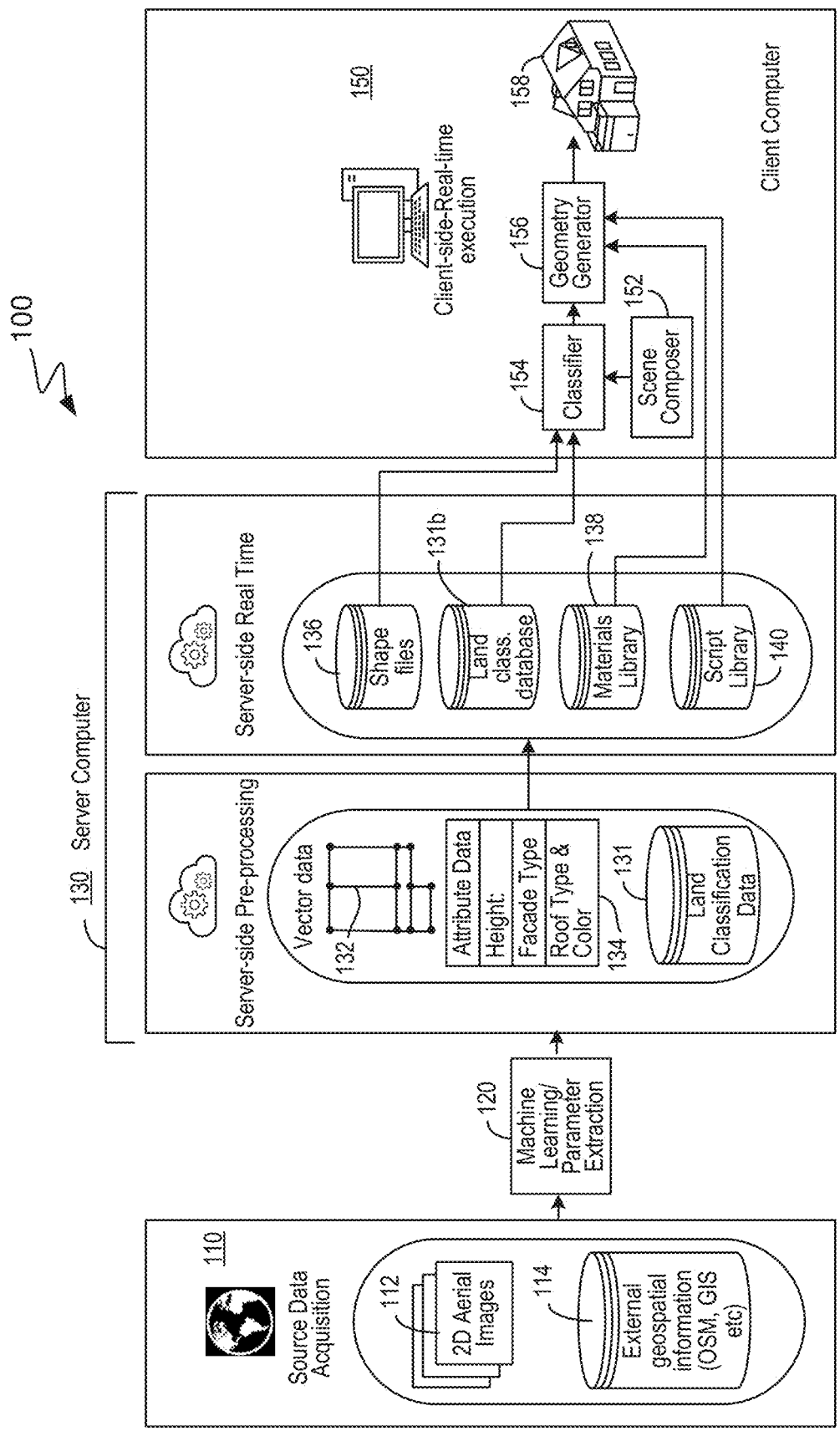
FIG. 2 is a 3-D reconstruction system according to one embodiment.

FIG. 2 is a 3-D reconstruction system according to one embodiment. Source data 110 is acquired from external geo-spatial information 114 such as OSM data (Open Street Map data), GIS data (Geographic Information Systems), DEM data (digital elevation model), land classifications, TIN data (triangulated irregular network), or from other commercial providers of geo-spatial information. Data may also be obtained from 2-D aerial images 112 (such as from satellite or airborne imaging by airplane or drone).

The various databases OSM, GIS, etc., may directly provide vector data such as the footprint of an object (such as a building, house, or other similar structure such as a factory or shopping center). The object footprint refers to the 2-D dimensions of a building. These databases OSM, GIS may also provide attribute data by instance attributes (e.g., number of the levels of a building or architectonic specifications). Such data is imported, annotated, and transformed into a data format such as CBOR.

Attributes may also be extracted from the aerial images 112 using a software module 120 that uses techniques such as machine learning for parameter extraction. Examples of machine learning and parameter extraction include using a set of neural networks that analyze each pixel of an image. To achieve this task, the networks are trained with training data. The better the training data, the more accurate the performance of the networks and therefore the parameter extraction.

By way of example, determining the footprint of a particular building may use a deeply connected, convolutional network (DCNN) based upon the DeepLab-LargeFOV. An extra layer at the end of the DCNN refines these footprints, enforcing rectified corners. Manual heuristics may also be used to mitigate edge cases not recognizable by humans. In addition, a rooftop type may be classified using a Random Decision Forest using features extracted from the footprints and aerial images. Attributes such as size, shape and color are also used to classify a rooftop. To represent a particular rooftop, we find that using a weighted straight skeleton algorithm allows us to represent many typical roofs by adjusting geometric parameters.

Rooftop color may also be determined using ground data to help improve the classification of rooftops. In particular, we have found that using adaptive strategy works well. We derive brightness and darkness threshold values for a given region and then analyze the color histogram of the rooftop aerial image. If no useful color can be defined, then we select a color from a color palette specific to the given region. A material used for the rooftop can be derived directly from the rooftop type.

Server computer 130 receives the vector data 132, attribute data 134 and land classifications 131*a* for any number of objects. Module 120 may also execute here to produce data 132 and 134. Server-side pre-processing occurs on computer 130 using data 132, 134 and 131*a* to produce databases 136, 131*b*, 138 and 140 (as described below), and these databases are then available in real time for their contents to be downloaded to client computer 150. Preferably, server 130 feeds this real-time information to the operations on the CPU of the client computer. Components such as shape loader 232 and classifier 154 call information from the server during run time.

Land classification database 131*b* includes values for the geographic area where a footprint is found and values that identify the cultural background, density and land use of the area, and thus are used to determine the look and dimensions of the reconstructed buildings. By way of example, there are 26 different regions that define cultural aspects (Europe British, Europe Germanic, Europe French, Europe Med. West. Europe Med. East, Europe Russian, Middle East, etc.); a global population density value (ranging from 0 to 100%); and land use types (e.g. industrial zone, sub-urban etc.). Specific values for land use type used for urban infrastructure indicate urban density, building patterns and climate zone (dry or wet) and include: "Large City Highrise", "Large City Urban Grid Wet", "Medium City Urban Non Grid Dry" or "Small City Suburban Non Grid Wet." Values for land use type outside of an urban area may include "Forest," "Small Town," and "Field."

This database 131*b* may be on the server computer and is streamed to the client computer, although it may also reside on the client computer. In one embodiment, this database is produced from 131*a* by combining and extending existing Olsen map classifications (originally a 1 km×1 km tile-based classification system using over 100 land types) with neural network-based land classification data from aerial imagery. Preferably, land classification 131*b* database is installed on the client computer. In any case, the land classification database feeds directly into the classifier 154. Classifier 154 shill then use land classification (in combination with many other inputs) to determine the building type as is explained below.

The vector data and attribute data are on a per object basis, that is, each item of vector data and attribute data will describe a single object to be reconstructed, such as a single building, house or similar. In addition, the attribute data may be used not only to help reconstruct a building (such as roof color), but also to select and load a particular script (described below) that describes a particular building. For example, a land classification value and an attribute help to select a script to generate a building: if the land classification is "European downtown," and the height is extremely high (above a threshold), then it is likely the building is a skyscraper and a script that describes a skyscraper is loaded from the script loader 163. Some attributes perform both tasks. The attribute "roof type," having a value of "hipped" indicates that the building is a house rather than a warehouse with a flat roof (and that a script that describes a house should be loaded), and will also help reconstruct the house with an appropriate hipped roof.

Another purpose of the vector data and the pre-processing of that vector data is to obtain geometry for roads, bodies of water, rivers and selected types of land uses from OSM data (OpenStreetMap data), organize it in a tile structure and make it available. A challenge when preparing such detailed geometry data on a global scale is data size, thus, compression may be used to obtain a small memory footprint. As a goal is not only small files on disk but also more detailed geometry in less main memory, even uncompressed data is kept as small as possible.

In one example of the detail that is stored we use OSM data. First, we take the full precision latitude/longitude coordinates from OSM and convert them into a tile-local fixed-point coordinate system. Although metadata takes up space in files, geometry data constitutes the major part of the vector data and thus is the main target of optimization. OSM organizes its data in points (vertices), line strings and (multi) polygons. Each original vertex is a full precision latitude/ longitude tuple (in the context of OpenStreetMap, in order to maintain the data in one single frame of reference), however, our data is organized in well-defined tiles which provide an alternative frame of reference. By converting the original 64-bit coordinates into a tile-local coordinate space we quantize all values to a 16-bit fixed-point grid without losing any visually perceivable precision and thus end up with a compression ratio of 4:1. Preferably, the fixed-point grid extends slightly beyond the actual tile boundaries to avoid any possible visual artifacts.

Geometries on low zoom levels (<LOD 14) are simplified to an extent that is visually equivalent to geometries rendered on higher zoom levels (given the actual resolution of the rendered textures/masks in absolute world space units). Data on low zoom levels may also refrain from saving less important features altogether (e.g., residential roads on tiles<LOD 12). The final binary vector data from the preprocessing is organized in a hierarchical structure and the CGL container format provides this structure. The binary vector data become subsections of the CGL file and has a header assigned. The header section and each data subsection are finally compressed by a general compression algorithm. In this way the data is kept accessible per tile while shrinking the data even further.

Shape files database 136, material library 138 and script library 140 are created and stored on server computer 130 as will be described in greater detail below. Typically, the contents of material library 138 and script library 140 are downloaded to client computer 150 when the software application begins execution on the client computer, as the materials and buildings will not change during the course of the simulation, game, etc. If the context of the simulation or game changes dramatically, i.e., a move from an urban environment to a desert environment, then other contents of these databases may need to be downloaded. Contents of the shape file database 136, though, will be downloaded in real time as the simulation or game progresses in order to reconstruct and render specific objects, such as buildings, as the user moves within the simulation or game.

Figure 3:
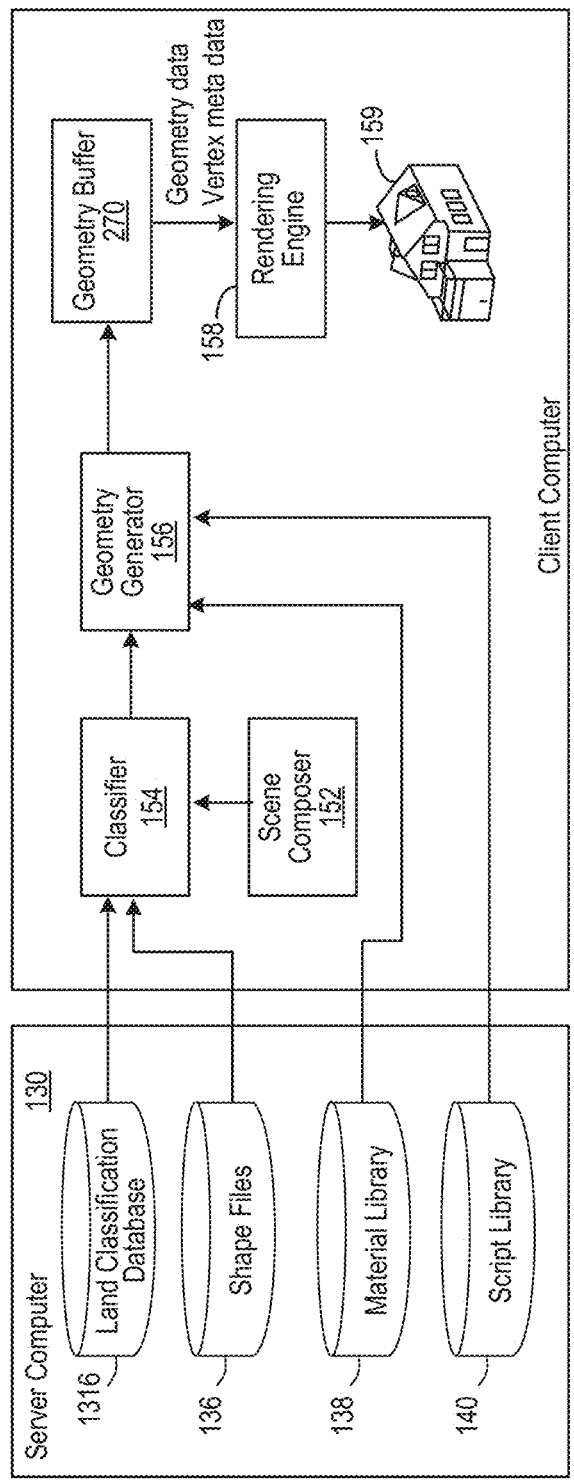
FIG. 3 is a block diagram showing another view of the reconstruction system.

FIG. 3 is a block diagram showing another view of the reconstruction system. Present upon server computer 130 are land classification database 131b, shape files database 136, material library 138 and script library 140. Present upon client computer 150 are classifier 154, scene composer 152 and geometry generator 156. (other components not shown). Generally, geometry generator 156 encompasses the operations of grammar processor 260 and executing scripts 242.

Rendering engine 158 may be any suitable rendering engine, including any of the openly accessible engines for development such as the Unreal engine available from Epic Games or Unity (by Unity Technologies), and other company-exclusive engines like Bongfish's own SOMA engine or the Frostbite engine by Electronic Arts. Shown at 159 is a two-dimensional display on the client computer of a house that is based upon rendering three-dimensional geometry data.

The rendering engine is typically a logically separated module within a game engine. A game or simulator then uses this game engine and its modules by communicating over an abstracted interface (aka Engine API) to display its content and react on user input. When compiled for release, an executable program (game or simulator) includes the game engine and modules within the program. The invention as described herein may be implemented as another engine module that communicates with the rendering engine API to display its output via the rendering engine.

Components of Reconstruction System

Figure 4:
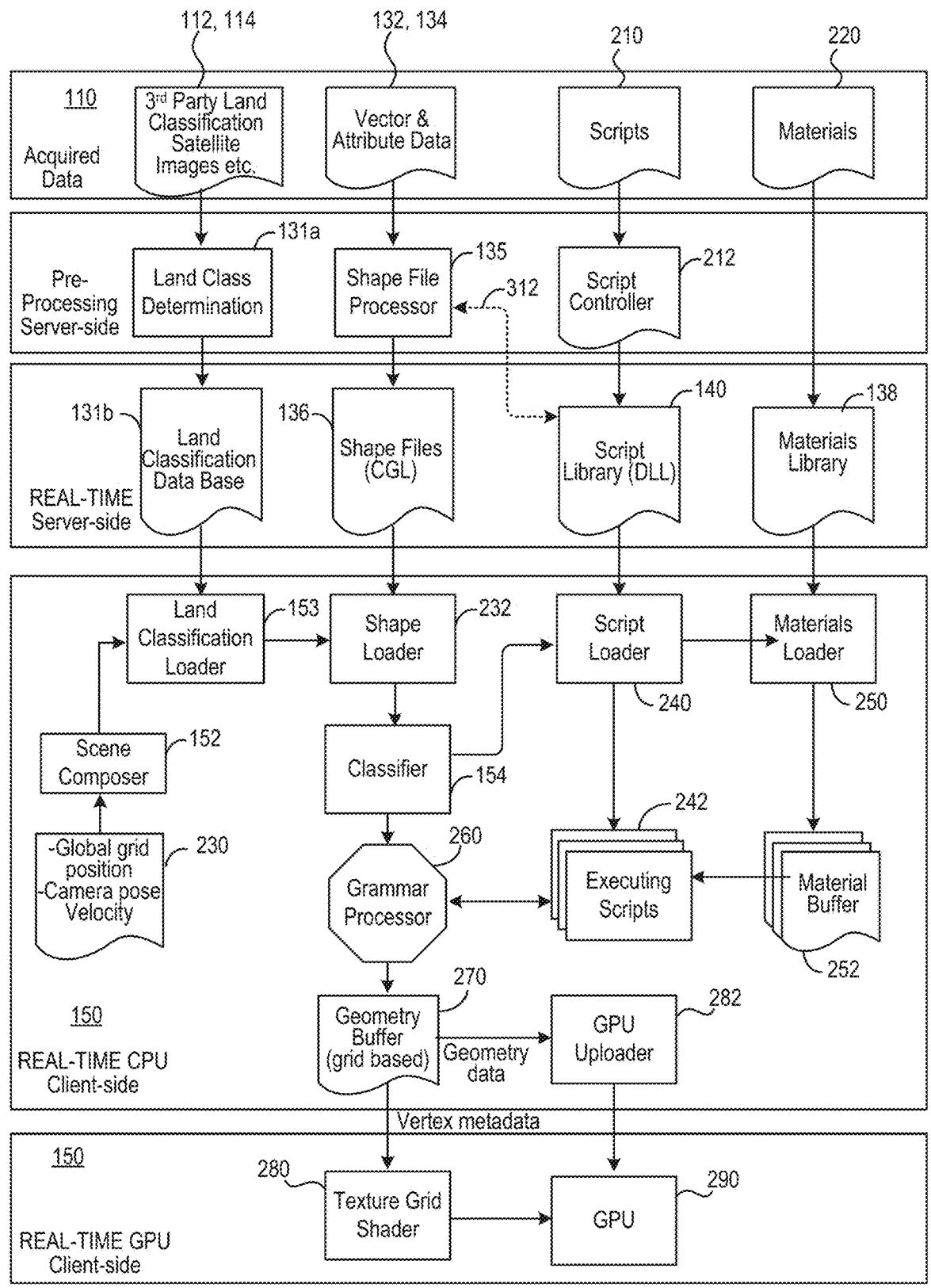
FIG. 4 is a block diagram showing components of the 3-D reconstruction system and how information flows between component and computers.

FIG. 4 is a block diagram showing components of the 3-D reconstruction system 100 and how information flows between component and computers.

Acquired data 110 are the data that server computer 130 will use to prepare shape files 136, script library 140, land database 131b, and material library 138. Although databases 110 may be present on server computer 130 (or in association with), it is also contemplated that these databases may reside elsewhere, even remotely, and the needed information will be communicated to the server computer for preprocessing as needed.

The vector data and attribute data have been generated from the two-dimensional images using machine learning or parameter extraction and the land classification data has been generated using pre-existing geographic data sets or by machine learning based classification. The vector and attribute data is then preprocessed on the server computer using a shape file processor 135 (a computer program) to produce any number of shape files in a shape files database 136. Each shape file includes the footprints, attributes and land classification for a particular region of the area to be reconstructed, such as an area that is one kilometer by one kilometer square, also referred to as a "tile." Of course, each shape file may represent smaller or larger areas. A shape file may be in any suitable data format such as CBOR, although it is found that by representing the data in CGL (Compressed Geo-data Library) format is more efficient for packing the data into less space and for downloading the shape files in real time from server computer 130 to client computer 150. Other formats may also be used. In one specific embodiment, the CGL format is used and is explained in more detail in Appendix C.

The shape file processor knows which tile of a region to create and how many tiles because it is triggered on a specific region (polygon or bounding box, longitude/latitude). Once the tile or tiles are done, they are automatically available to be streamed to the client. In one embodiment, the region is the entire earth, so the shape file processor processes all (GIS, LC) data available.

Also included within databases 110 are any number of scripts 210 (also referred to as "grammar scripts"). Each script is a computer program that represents a building type and describes how a building may be reconstructed (based upon input such as footprints, building attributes, land classification, etc.) on a processor of the client computer for display using a rendering engine. Advantageously, the present invention does not use a single program to describe and reconstruct all potential buildings; each script describes how to reconstruct a particular type of building (e.g., skyscraper, single-family home, multi-family residence, hanger, shack, house, etc.), thus simplifying each script, facilitating changes to a particular script, and speeding up the reconstruction of buildings on the client computer in real time. For example, one script may describe how to reconstruct a skyscraper (based upon footprint, attributes, land-use, etc.) or, there may be two scripts; one describing a "1970s skyscraper" and the other describing a "modern skyscraper." Other scripts may describe how to reconstruct a single family suburban house, an Italian City House, a middle-European Haussmann City House, a modern city block, etc.

Each script utilizes geometric functions such as "Extrude" (to reconstruct a building upwards from a footprint and having a particular height), "Split" (to add more doors and windows), a function to draw the façade of the building or other predefined areas of the building, and a variety of other geometric functions to create a particular roof type, etc. Advantageously, each script need not dictate exactly the dimensions of a building, it describes how to reconstruct a building based upon input footprint. For example, the script may describe a size and look of a certain window of a building type and then will automatically add any number of those windows in a row depending upon the width of the building footprint that is input.

In addition, placement rules may be used within a script to add various props to a roof of a building (for example) such as skylights, ventilation ducts, air-conditioning units, etc. A placement rule for an AV vent may be: "Load(Objects.m02_ventilation_02);" where "m02" means that the vent maximum is 2×2 meters, and "02" means that it is the second one to be generated.

Accordingly, each script in database 210 is written by a programmer in a source code language that uses these functions, libraries etc., to describe a particular building type. During preprocessing on server 130, the script compiler 212 not only transpiles each script into the C++ programming language, but also then compiles the C++ code for each script into machine language for execution on the processor of the client computer. By contrast, the prior art typically uses an interpreter to process a program line by line in order to create a building, which is far slower than using compiled machine language. The script compiler 212 transpiles each script into C++ using a multi-pass compiler. The input is converted to an abstract syntax tree (AST) using an ANTLR-based parser and then subjected to several separate compiler passes to generate the C++ code. Any suitable source code language may be used to write each script and an example of a domain-specific language (DSL) is presented below. A similar language is CGA (Computer Generated Architecture) used by CityEngine which may also be used to write scripts.

Compilation of the C++ code into machine language may be performed using any C++ compiler which targets the CPU of the client computer. Once each script is compiled, it is stored into a DLL file and there may be more than one script in each DLL file. These DLL files are stored in a script library 140 on the server computer. During operation, these DLL files will be downloaded in real time by script loader 240 of the client computer as will be described in greater detail below. Advantageously, downloading of a DLL file may be accomplished in real time (unless downloaded earlier) and is far faster than attempting to download complete geometry data of a building; in addition, execution of a script in a DLL file may be accomplished quickly and in real time on the client computer. The term "script" may refer to the source code script program (such as in database 210) or may refer to the compiled machine language script (such as those stored in library 140) and the context and will make the meaning clear. In one specific embodiment, an implementation of scripts in a particular domain specific language (DSL), the script compiler, the script library, and execution of the scripts may be performed as described below in Appendix A. And, in another specific embodiment, scripts may be written as described in Appendix B.

Also included within source databases 110 are any number of material sources 220. Materials refer to a variety of functions, libraries, computer code, etc., used to provide color or texture to a building or other structure, and do not necessarily describe the structure of a building or how to reconstruct it. These material sources 220 include pre-produced, architectonic artwork from technical artists.

When these materials are transferred into material library 138 on server computer 130 they may be compressed in order to save space and to speed up downloading time. Accordingly, material library 138 includes a collection of functions, libraries or other computer code that may be called by a script program in the process of reconstructing a building. By way of example, there may be a color map, a texture map, a definition of a particular material (e.g., "red brick"), a window texture, a door texture, texture for a particular fence on the balcony, a wall texture, a texture to create a chimney, or even a mesh used to reconstruct a complex object on top of or next to a building, such as a bicycle leaning against a building. During execution of a particular script on client computer 150, any of these materials may be applied procedurally during execution of that script in order to reconstruct a building.

Referring now to components that execute upon the CPU (or GPU) of the client computer 150, a scene composer module 152 directs shape loader 232 to download certain shape files based upon a particular scene as viewed by the role player in the game or simulator, as well as directs loader 153 to download the appropriate land classifications. Scene composers are known in the art, and accept input such as the global grid position of the role player within the game or simulation or, the camera pose of that role player, his or her direction of view, his or her velocity, etc., as shown at 230. Based on this information, scene composer 152 then directs shape loader 232 to download certain shape files 136 and directs loader 153. Various shape files may be preloaded (based upon how close various buildings are to the coordinates of the role player), the shape files for buildings determined to be more or less in front of the role player may be downloaded, or shape files may be downloaded in real time as they come into the field of view of the role player. Thus, scene composer 152 determines/triggers which region needs to be created. Shape loader 232 calls the pre-processed shape files 136 in real time from the server as per 152.

And even though the scene composer is known in the art, the present invention makes use of the scene composer in a novel way in by directing the shape loader to download particular shape files in real time (based upon the scene) in order to make use of the shape files to reconstruct a particular building or buildings executing machine-readable scripts that are also downloaded from the server computer. The scripts may be streamed on demand from the script library (i.e., downloaded in real time as needed), or they may be downloaded ahead of time by the script loader 240 in order to be ready to execute.

Classifier 154 decides which scripts are necessary to execute based upon the footprints present in the shape file that have been downloaded by shape loader 232. For example, if a role player is approaching a shack in a game or simulator the shape loader will download a shape file which includes data for that shack and a classifier will determine that the building to reconstruct is in fact a "shack" (using a simple example of only one "shack" in the area). As known in the art, to some extent, a scene can be anticipated, or pre-loaded, such that a player can move through the scene fluidly of more structures are present. Typically, the scene data is downloaded by square tiles (e.g., 1×1 km2) depending on the viewer's position.

The classifier will then direct script loader 242 download a script DLL that includes the shack script which the script loader will do, unless that particular DLL has already been downloaded to the client computer. In general, the classifier determines which is the most likely building represented by a particular shape file, depending upon the building footprint and other extracted parameters and meta data like land use or demographic density. For example, given a small building footprint, the classifier may need to decide between a small house and a shack. The classifier may also provide each potential choice with a probability such as "70% probability" that the building represented by the shape is a shack.

Once the classifier informs the grammar processor 260 that the script for a "shack" should be executed, the grammar processor calls the "shack" script for execution and it executes as shown at 242, along with other executing scripts that the grammar processor may also have called. During execution of script, a particular script may use any of the aforementioned materials to reconstruct a particular building using material buffer 252.

As mentioned above, numerous predefined geometric functions are available in a database (not shown) on the client computer accessible by grammar processor 260. Preferably, these functions are originally written in the C++ source code and then compiled into suitable machine language for execution on the CPU of the client computer and stored as DLL files. Each geometric function is then available to be called by a script, thus freeing the writer of the script from having to write code to perform certain geometric functions that are common to numerous building types. By way of example, a geometric function may split a façade, may create a hipped roof, or may define the placing of rows of windows as well as the position of doors and gates, etc. Two often used functions are: "Extrude( )", which extrudes a footprint to a certain height, transforming the two-dimensional footprint into a three-dimensional object; and "CompSplit( )", which splits the shape it is applied on into three parts, top, mantle and bottom. Each one of these parts is followed or terminated by another rule.

Also available to the writer of the script are a handful of texture grid configurations that are basically parameters included within each script. By way of example, these texture grid configurations may include a description of doors, windows, window widths, etc., and will depend upon the type of building described in the script. These texture grid configurations will then be used by the texture grid shader 280 described below.

Figure 9A:
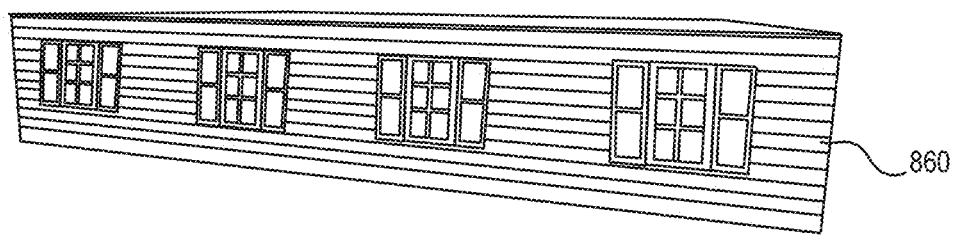
FIG. 9A shows a row of windows generated using a texture grid.
Figure 9B:
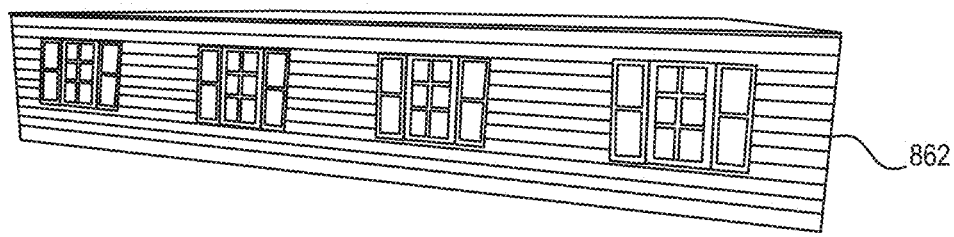
FIG. 9B shows the same row of windows may also be generated without the use of the texture grid.

A texture grid is a way to save on geometry detail; thus, instead of creating windows, doors and other façade features by "splits," (or other geometric functions) a façade is painted by a shader with the given configuration (window type, number of windows, rows, columns) on one façade surface without creating additional polygons for each feature (i.e., a window). For example, FIG. 9A shows a row of windows 860 generated using a texture grid. FIG. 9B shows the same row of windows 862 may also be generated without the use of the texture grid. FIG. 9C shows code 864 for the texture grid and code 866 for the split function. As shown, the code for the texture grid to generate these windows is more concise than that using geometry detail, additional polygons, and "splits" (or other geometric functions). Not shown is how windows 860 make use of a single polygon while windows 862 use four polygons.

Execution of a particular script (e.g., the shack) by grammar processor 260 on the CPU of the client computer generates the three-dimensional (3-D) texture mesh (or geometry data) that represents the particular structure represented by the script. This texture mesh is stored in a geometry buffer 270 on the client computer and may be stored in any suitable consumable format used by the rendering engine and is typically specific to a particular rendering engine.

An example of a format for the mesh vertices is the vertex buffer format. Various formats may be used. The vertex buffer format contains several layers of geometric and texture information: position (x,y,z), normal (x,y,z), tangent (x,y,z), color (r,g,b), texture coordinates (u,v), texture id (index), texture grid config id (index), and distance to ground (x). The first three "position, normal and tangent" are geometric data; "color" contains a specific RGB code; "texture coordinates" determines the placing of textures; and "texture id" and "texture grid config" tell the texture grid shader witch textures need to be called or used in the specific configuration (e.g., the window width or the texture of a façade or door). The "distance to ground" is used to blend in the buildings parts that touch the ground, e.g., the bottom edge of a wall will be darker/browner to create a more realistic feel to the house and how it is set into the scene/environment.

As known in the art, a rendering engine takes the three-dimensional texture mesh and basically puts it into a two-dimensional format suitable for viewing on a computer by rasterizing the information and then converting the information into pixels on a display. The rendering engine typically executes upon the GPU of the client computer and will include the GPU uploader 272 and add an optional texture grid shader 280.

The texture grid shader 280 is a function that allows texture, color, etc., to be added to an already formed 3-D texture mesh using the GPU of the client computer rather than reconstructing all details of the building using the CPU of the client computer. Thus, a two-stage process results in which the grammar processor 260 on the CPU creates the 3-D texture mesh including the basic geometry of the building, while the texture grid shader 280 executing on the GPU adds information that describes a façade, adds texture, adds color to a building or part of the building, describes color or structure of a window or door, allows additional rows of windows to be added, etc. This two-stage process is more efficient because creation of the 3-D texture mesh on the CPU will be less complex and have fewer vertices. The texture grid shader 280 then executes upon the GPU and executes a function to describe the façade, for example, which is based upon metadata information received from a vertex in the mesh. Preferably, the texture grid shader is available on the client computer as a compiled shader resource upon application installation and may be used as described above to reduce complexity.

GPU uploader 272 uploads the geometry data from geometry buffer 270 into GPU 290 where the rendering engine is executing. During the execution, the rendering engine will also accept input from texture grid shader 280 in order to add texture, color, etc. to the façade, for example, of a building.

Figure 5:
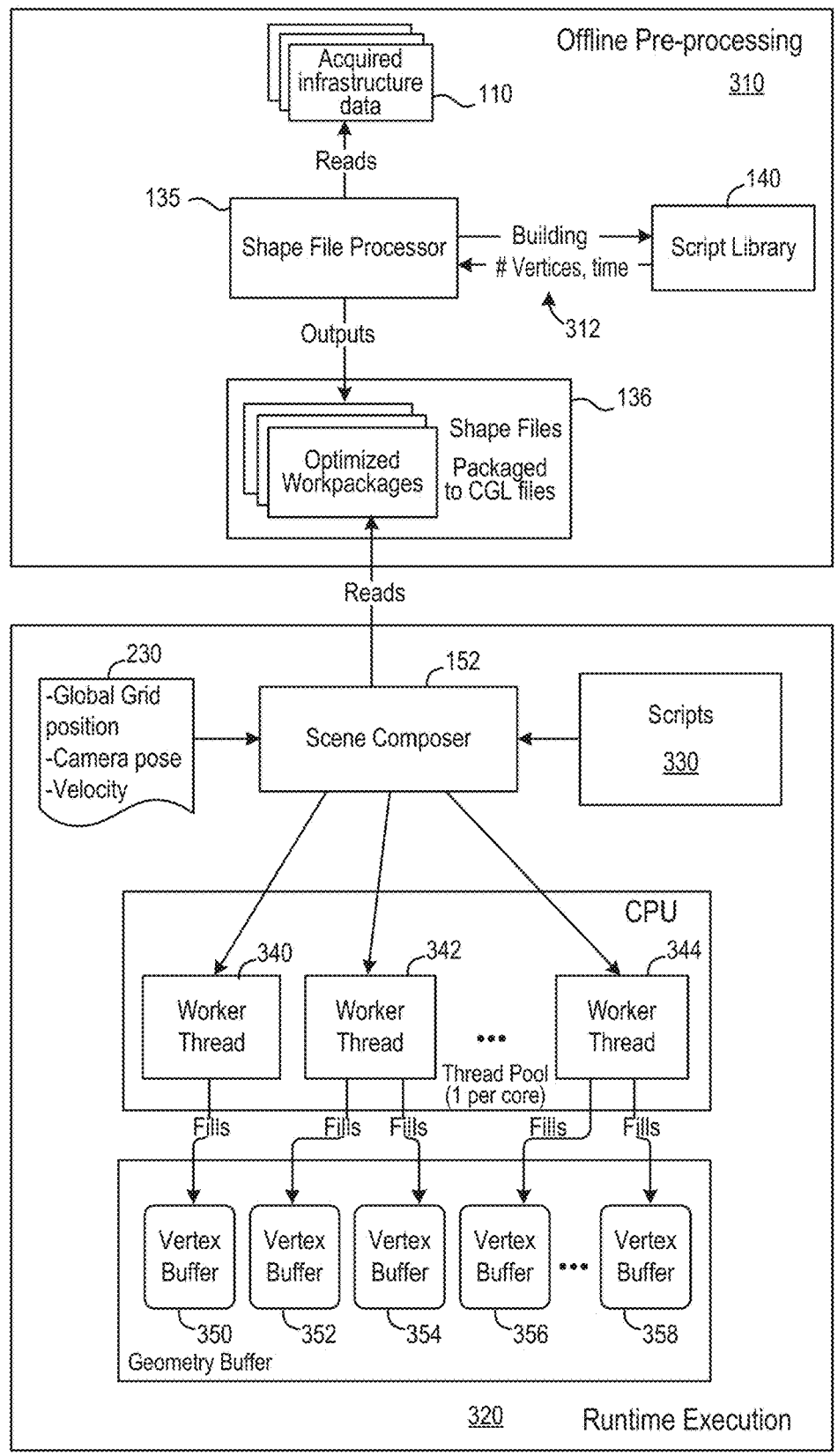
FIG. 5 is a workload management diagram showing one embodiment for off-line preprocessing and runtime execution.

FIG. 5 is a workload management diagram showing one embodiment for off-line preprocessing and runtime execution. The actual implementation of the invention upon server computer 130 and client computer 150 may be performed in different manners, depending upon when a particular simulator or game directs that tiles, materials and scripts be downloaded from the server computer, and depending upon how many CPU cores are available on the client computer. In one particular embodiment, implementation may be performed as shown in FIG. 5.

As described above, off-line preprocessing 310 occurs on server computer 130. A shape file processor 135 reads the acquired source data 110 and outputs shape files 136 (packaged as CGL files). Each shape file is referred to as an "optimized work package" because the file size is optimized for the run-time execution.

FIG. 5 shows a pre-processing step 312. This is a server-side run-time test step to determine the processing time and buffer size needed to optimize the worker threads for the scene composer for the actual reconstruction. Double arrow line 312 in FIG. 4 between 135 and 140 also shows this step. This step illustrates the fact that there is a pre-processed relation before the actual processing of the shape files and the scripts. Such optimization is desirable but not necessary.

During run-time execution on the client computer, scene composer 152 accepts input 230 regarding the user's point of view within the simulator or game, and directs grammar processor 260 (via shape loader 232, classifier 154, and script loader 240) to execute a number of scripts (e.g., one specified script per building instance selected by the classifier) via worker threads 340-344. Each thread then fills a particular vertex buffer 350-358 with the geometry data for a particular building that has been reconstructed.

Example Reconstruction of Sub-Urban House

FIGS. 6A-6E illustrate one example in which a two-dimensional aerial image (and other data) is processed on a server, a script file is created and compiled, and eventually a building in the aerial image is reconstructed on a client computer. This example is explained briefly below and will be referred to in the following flow diagrams. It is an illustration of the principles used.

FIG. 6A is a two-dimensional aerial image 604 of a suburban town in western France. Shown in this image is the outline of a particular house 608 which will be reconstructed on a client computer using techniques of the present invention. FIG. 6B is instance data 612 associated with house 608 and includes attributes such as a precise location, building type, roof type, roof color, and vertices. Attributes may have other values, for example, roof type may be: flat, mansard, hipped, shed, etc.

The vertices shown in FIG. 6B are used as the input for the extrude function 624 in FIG. 6D. Thus, there is a relation between code and data, i.e., the data feeds into the functions. The instance data 612 originates in FIG. 4 in vector database 132, whereas the script 620 of FIG. 6D originates in scripts database 210 in FIG. 4.

FIG. 6C shows a footprint 616 of house 608 which has been obtained from the aerial image. Information on the number of floors of the house and floor height is included in the data base 134 which also includes other attributes such as roof color and roof type. Land classification database 131 includes data such as land classification, population density, etc., that pertain to the area where house 608 is located. The footprint 616 along with its instance data, attributes and land classification data may then be placed into a shape file and then imported into geometry generator 156 for reconstruction. Other examples of instance data include:

```
{
    "id": 89783767909007,
    "roof_type": 4,
    "roof_color": [
        0.41568627450980394,
        0.35294117647058826,
        0.3176470588235294
```

-continued

```
    ],
    "roof_color_string": "rgb(106, 90, 81)",
    "building_type": 2,
    "building_levels": 1
}
```

FIG. 6D is an example of a suburban house script 620 written in a domain specific language (DSL). As mentioned above, this script will be compiled and then downloaded to the client computer 150 for execution in real time in order to reconstruct a three-dimensional representation of house 608. Script 620 includes a variety of functions used to reconstruct a suburban house. For example, in line 37 the function "Extrude" 624 reconstructs the basic geometry of the building by using information on the footprint, the number of floors within the house and the height of each floor. Then, in line 38 "CompSplit" 628 defines the house has a roof and walls and neglects the bottom of the building by discarding it. For the walls of the house, the function "DrawTexture" 632 uses the texture "test/test_02" (line 46). The function "Generate" 634 (and also in lines 51 and 55) executes the preceding function. The function "RoofGabledOverhang" (line 53) 636 reconstructs the gabled roof. Thus, execution of this script 620 on the client computer will create a three-dimensional representation of this house and outputs the geometry data.

Figure 6E:
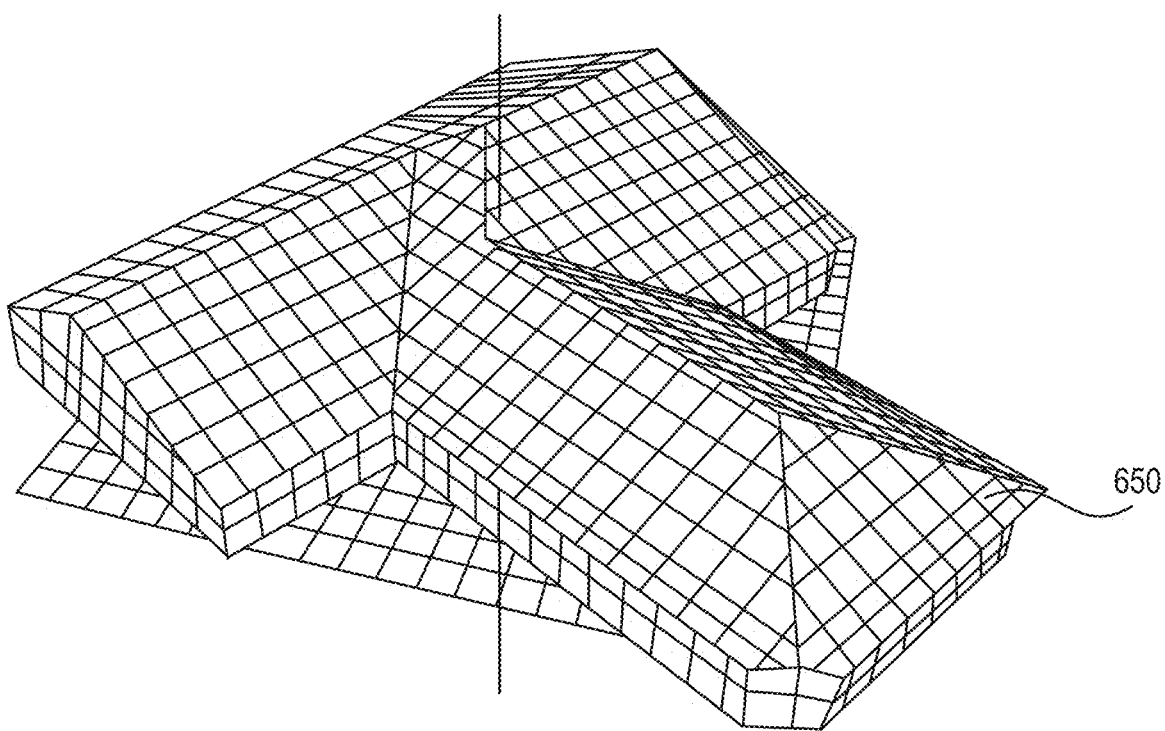
FIG. 6E is a three-dimensional representation of a suburban house.

FIG. 6E is a three-dimensional representation 650 of suburban house 608. This three-dimensional representation is the output of execution of the compiled version of script 620. This is a simple example and additional steps may add further geometries, textures and details (like AC units on a roof or a bicycle leaning on a wall). Of course, this figure shows a two-dimensional view that is seen by a user of the client computer after the three-dimensional texture mesh has been processed by rendering engine 158.

Example Level of Detail of a House

As mentioned above, a script may implement varying levels of detail for a building. In one embodiment, the level of detail (LOD) is represented as an "If" function in a script. Depending on the LOD, certain functions for specific building details may be included or not. The LOD may depend upon the resolution setting of the game and the distance from the avatar to the building, or simply upon the distance. In one example (in this case for high resolution): LOD0 is for a distance of less than 6,000 m; LOD1 is for a distance of less than 1,500 in; and LOD2 is for a distance of less than 750 in.

Figure 10B:
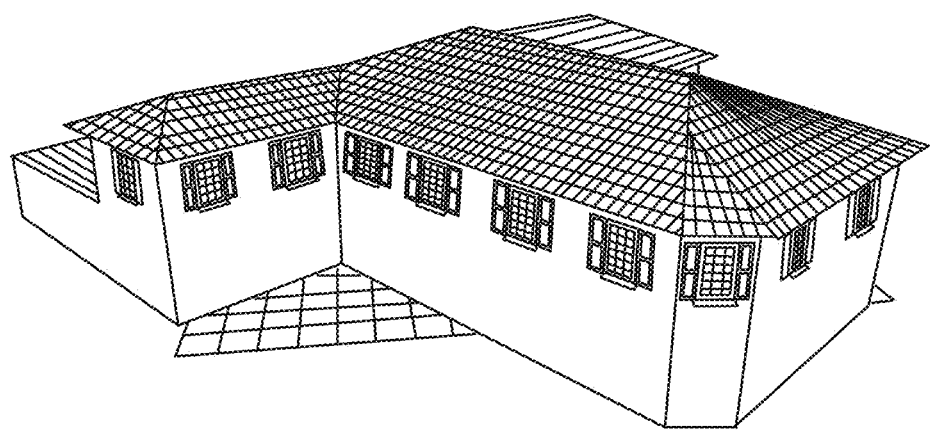
FIG. 10B is an example of a house with a low level of detail.
Figure 10C:
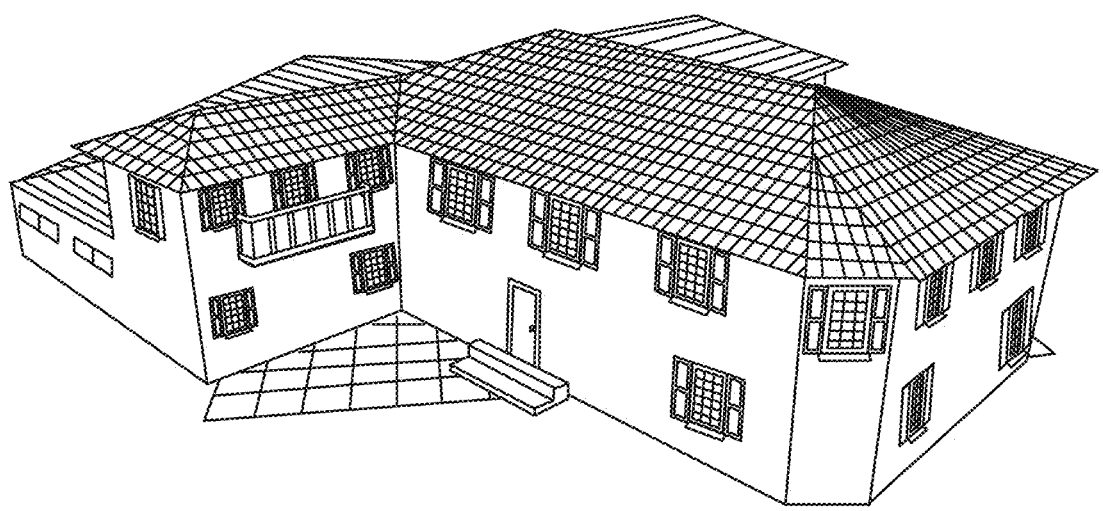
FIG. 10C is an example of the same house with a higher level of detail.

FIG. 10A is a portion of a script for a garage of a house. Shown in the script is an "If" function that implements a desired structure for the garage that depends upon the level of detail. In this example, the mantle section is reconstructed in more detail if the LOD is greater than 2. FIG. 10B is an example of a house with a low level of detail. Note that the lower level has no windows, doors or stoop. FIG. 10C is an example of the same house with a higher level of detail. The lower level now has windows, doors, a stoop, and, the upper level now has a balcony, extra windows, skylight and a chimney.

Flow Diagrams

As mentioned earlier, the present invention is applicable to a software application such as a simulator or game being executed upon a client computer, accordingly, a number of preprocessing steps may occur on a server computer prior to execution of that application. In some cases the results of that preprocessing may be downloaded to the client computer before execution of the application, although any of the results may also be downloaded on the application begins, or in real time as the application executes.

In a current embodiment, the scripts DLLs and materials are downloaded before execution, but on-demand loading of these is also possible. Shape files and land classification data is typically only available on demand (in real-time) when requested by the application executing upon the client computer; however, caching may be used to avoid redundant data downloading.

Figure 7:
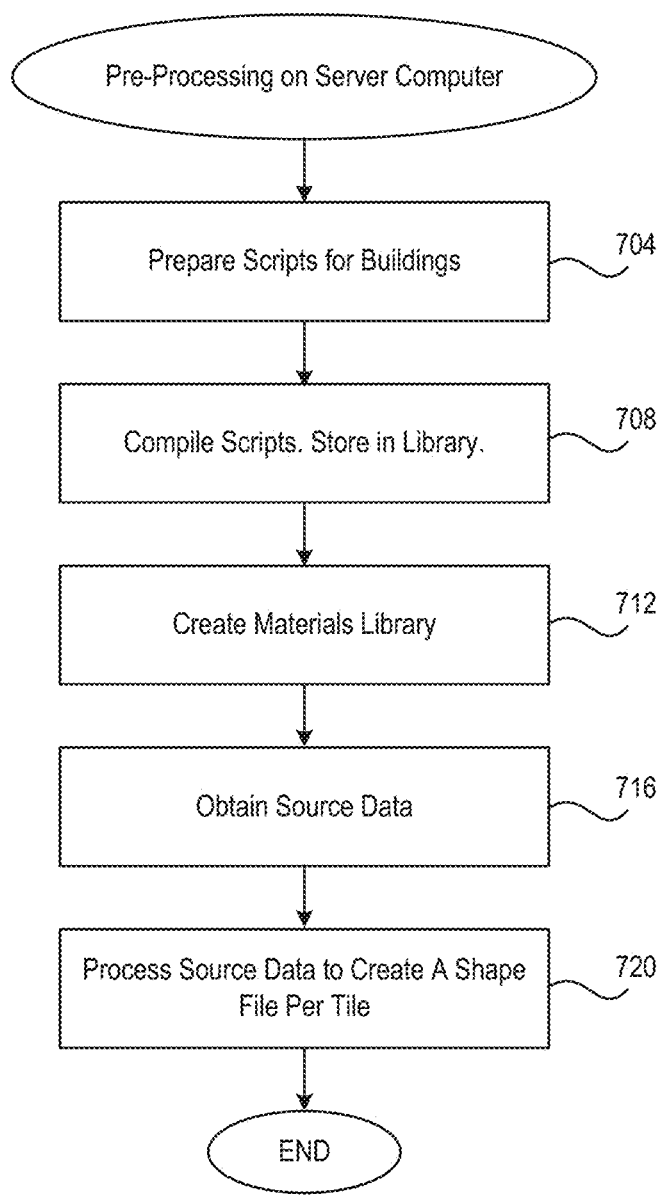
FIG. 7 is a flow diagram describing one embodiment by which preprocessing occurs on a server computer.

FIG. 7 is a flow diagram describing one embodiment by which preprocessing occurs on a server computer 130. Certain of the below steps need not be performed in the order they appear, for example, creating the materials library of step 712 may be performed earlier or later in the flow diagram. In a step 704 scripts are prepared in a source code language for any of a number of building types as mentioned earlier. An example of such a script and an example domain specific language is shown in FIG. 6D and is described above with respect scripts 210 in FIG. 4. In a next step 708 each script is compiled on the server computer (first transpiled into C++ and then compiled into machine language) and stored in a script library 140 as has been described above.

In a step 712 a material library database 138 is created upon the server computer using materials 220 as has been described above. In a step 716 source data 110 is acquired and is processed as has been described with respect to FIG. 2 in order to populate a land classification database 131, vector data 132 and attribute data 134 on server computer 130. For example, FIG. 6A shows an aerial image 604 that is acquired and then processed to produce footprint 616 and attribute data such as roof type, roof color, building type, number of building levels, etc., as well as instance data of FIG. 6B. In one particular embodiment, image 604 is a single-view aerial two-dimensional image, although other types of aerial images may be used.

As mentioned above, a variety of attributes are associated with each building found in an aerial image may be extracted from the source data 110 using module 120 as described above. For example, a neural network may be used to detect each building footprint and put it into vector form. The roof type of each building can be extracted from the data using Extremely Randomized Trees, a type of Random Forest algorithm. The actual roof of a particular building will then be reconstructed using a particular portion of a script using deterministic or probalistic confinements depending upon the region. Roof color can be detected from an aerial image using a sequence of heuristics and may then be applied to the specific roof type of the building.

An example of a heuristic is as follows; the heuristic finds an average of the dominate roof colors on a detected building/footprint. We are able to detect roof color from aerial images underlying a footprint using a sequence of heuristics: 1) initialize selection mask from footprint shape; 2) exclude green pixels from mask (but keep at least 25% of pixels); 3) exclude very dark pixels from mask, and exclude darker half of remaining pixels; 4) convert pixels in mask to HSV, create histogram of hue values (16 bins), and find most common bin; reduce mask to pixels belonging to that bin; and 5) average colors within remaining mask in HSV space, then convert back to RGB.

Façade type (a vertical façade) is an attribute that is typically defined by the region and land-use type of the area in which the building is found. Sets of façade types may also be grouped by categories such as residential, commercial, industrial, etc. During execution, each executing script will generate each façade based upon region, as modified by population density, footprint area, roof type, and height. The attribute building height is typically an approximation according to the specific region and may be determined by correlating extracted data and external geo-spatial information such as footprint area, roof type appearance, and land-use type. Values for the attribute land-use type have been mentioned above and may be obtained by subdividing an aerial image into quadratic areas (so-called "tiles") of approximately one kilometer by one kilometer. A neural network may then be used to classify each tile as one of the listed land-use types.

In one particular embodiment, only a building footprint and location are necessary in order to reconstruct a building. In other words, the footprint and the geographic location are enough to approximate the height of the building and to determine further attributes in order to reconstruct the building.

In a next step 720, data 131, 132 and 134 is preprocessed using shape file processor 135 to produce any number of shape files in a shape file database 136. Preferably, each shape file represents an area that is one kilometer by one kilometer square known as a "tile." In general, using a shape file processor to create shape files from vector and attribute data is a known technology. The footprint of each building is associated with its attributes and vector information as that data is included in the corresponding shape file along with each footprint.

Now that the information in databases 136, 138 and 140 has been created, execution of the software application on the client computer 150 may begin.

Figure 8A:
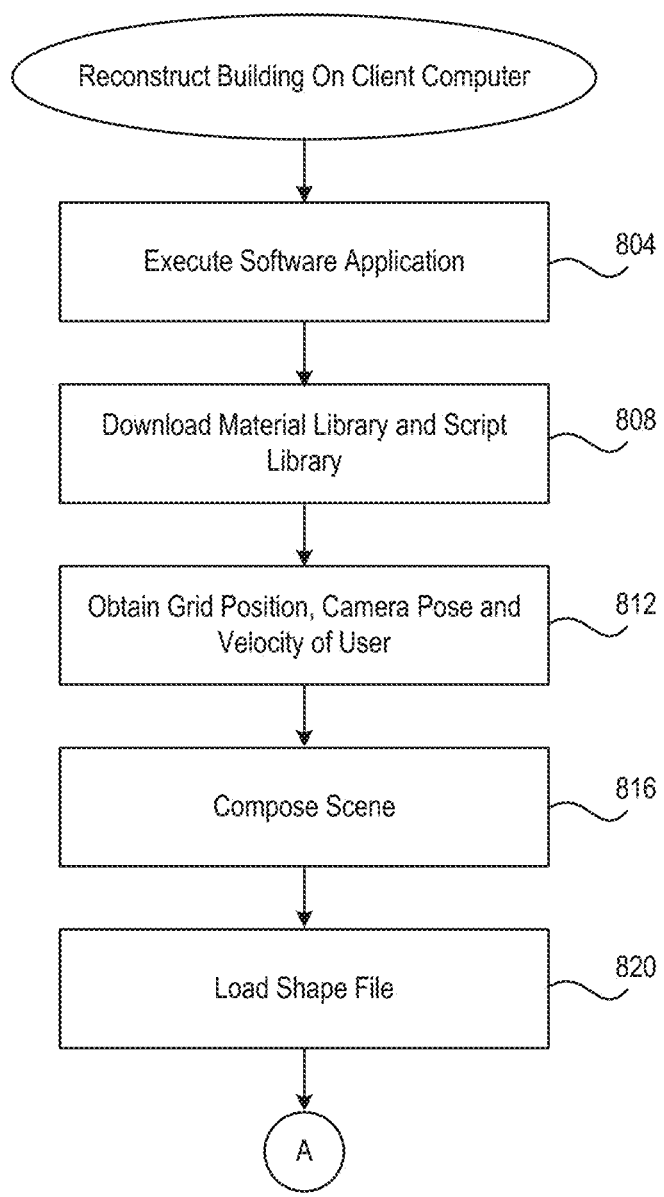
FIGS. 8A and 8B are a flow diagram of reconstructing a building.
Figure 8B:
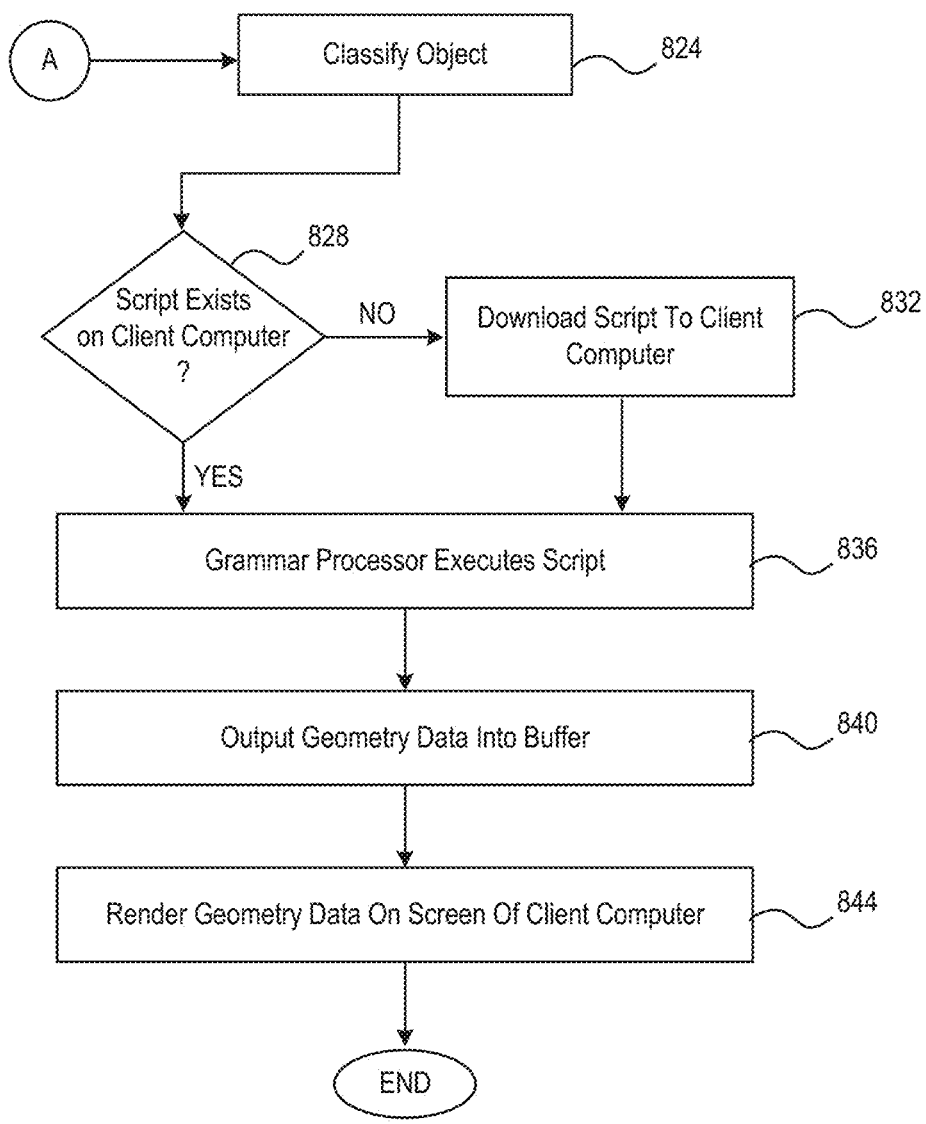

FIGS. 8A and 8B are a flow diagram describing one embodiment in which the software application executes upon the client computer and one or more buildings are reconstructed in real time as the user interacts with the application. Certain of the below steps need not be performed in the order they appear, for example, downloading of the material library and script library may occur before executing the software application.

In a first step 804 a suitable software application begins execution upon client computer 150 using techniques known in the art. Suitable software applications that may incorporate the present invention include: training simulators, simulation games, video games, and other types of applications such as virtual reality (VR) environments. In general it is contemplated that the techniques of the invention may be incorporated into such an application by integrating the invention with the application's engine. By way of example, the four components in FIG. 4 (270, 272, 280, 290) may be integrated. It is also possible that the invention is a module that is integrated with the application.

Once the application is executing, a number of steps may occur to ready the simulator or game for use before the user actually starts interacting with the application. For example, in step 808 a materials loader module 250 downloads any needed materials from materials library 138 on the server computer and these materials are stored on the client computer. Preferably, for optimal run-time generation, the materials are stored on the client computer.

It is also possible to download any or all of the script DLL files from library 140 at this point using script loader module 240 to the client computer, although it is also possible to download a particular DLL file containing a script that is needed as identified by classifier 154 in real time (described below).

Once the user begins interacting with the simulator or game his or her character (or avatar) or other point of reference moves within the landscape of the game and generates a grid position, camera pose and a certain velocity (i.e., speed and direction) as is known in the art. In step 812 this information is obtained and fed into scene composer module 152. Next, in step 816 the scene composer module 152 composes in real time the current scene in order to determine which particular shape file or files are needed at this point in time of the simulator or game in order to reconstruct the appropriate building or buildings within view of the avatar. As mentioned, once a shape file is identified, it may be downloaded at this point in real time or it may have already been preloaded. If needed, in step 820 the shape loader module 232 downloads the needed shape file (or files) and makes the shape file available to the classifier module 154. In one particular example, the meta-data for a specific scene is pre-established and is called by the shape loader 232 for a specific tile (determined by the scene composer 152 depending on 230, the player's position). Each scene works on a tile basis and not per single house.

In a next step 824 classifier 154 classifies a particular object (such as building footprint) found within the downloaded shape file (or in an identified shape file that has already been downloaded) in order to identify which script should be executed in order to generate the three-dimensional texture mesh for this footprint. The classifier may use a variety of techniques in order to classify a footprint as a particular building type. Techniques such as a simple decision rule set may be implemented that does not account for the relations between the different types of data. Or, a machine learning-based approach may be used to decide on the building to be constructed, achieved through appropriate training.

In one particular embodiment of the invention, a decision matrix (embedded in the classifier) allows the invention to provide region- and culture-specific data identifying the most likely building type that corresponds to this footprint within this tile. This matrix uses heuristics to determine which kind of building should be generated for a specific footprint.

The determining factor in the decision is the view field and the position/vector of the player. Each tile has a unique identifier and the scene composer 152 will decide which tiles need to be generated for a specific situation, recognizing the probable movement of a player. The classifier receives the CGL file (shape file with attribute data) for a tile from loader 232. The CGL file has all the footprints for the respective tile and its building specifications. The grammar processor 260 then loads the scripts for each classified building in the shape file and the process pipeline as depicted in FIG. 4 unfolds.

The output of this step will be one of any of the script types that have already been prepared and compiled as described above. Once the script type is identified, in step 828 the classifier determines if the DLL file including the compiled script code for this type of script has already been downloaded to the client computer by script loader 240.

If not, then in step 832 script loader module 240 downloads the appropriate DLL file to the client computer for execution. If so, then control moves to step 836 where the grammar processor module 260 begins execution of that script as shown at 242. FIG. 6D shows one example of the source code of a particular script 624 reconstructing a suburban house. As mentioned, this source code is compiled and stored in a DLL file which is executed. It should be appreciated that in accordance with FIG. 5, scene composer 152 may direct (using the shape loader, classifier, script loader and grammar processor) that numerous scripts from a particular tile be executed in real time using the various worker threads 340-344 executing upon the cores of a processor or processors on the client computer.

The optimal number of worker threads that may be executing scripts at any one time is dependent upon the computational capabilities of a certain computer. Most important is the number of physical cores that can be used; it is preferable not to use all of them at once because that would slow down the rest of the simulation if there is not enough computational capacity left.

For example, as user directs his or her avatar to walk down a street in a particular city, the scene composer will compose this scene of a city street with buildings either side and it may be necessary for the grammar processor to execute a number of scripts at the same time representing the buildings on either side of the street as the user progresses down the street.

During the course of downloading a particular script, it may be necessary for script loader 240 (based upon materials identified within the script) to direct materials loader module 250 to download more materials from library 138 for storage into material buffer 252 on the client computer. Further, during execution of script 242, a particular script may call or use any of the materials in buffer 252 to assist with reconstruction.

As explained above, execution of a script produces the three-dimensional texture mesh (or geometry data) for a particular building. In a next step 840 this geometry data for the building is output into a geometry buffer 270. Thus, the geometry data for a particular building has been reconstructed in real time upon the client computer using a script that describes the particular building type and using the building footprint, other attributes, and land classification data. It should also be appreciated that in accordance with FIG. 5, a number of scripts are executing in real time and outputting geometry data to vertex buffers 350-358 thus reconstructing a number of buildings in real time.

Next, in step 844 the rendering engine (executing upon GPU 290), uploads this geometry data using GPU uploader 272 and renders the appropriate image of that building on the display screen of client computer 150. Use of a rendering engine to render a two-dimensional image based upon geometry data is known in the art. In addition, as explained above, texture grid shader 280 may also be used to provide texture, color, or shading to the reconstructed building. An example of a reconstructed building rendered by the rendering engine on the display of a computer is shown at FIG. 6E.

Computer System Embodiment

Figure 11A:
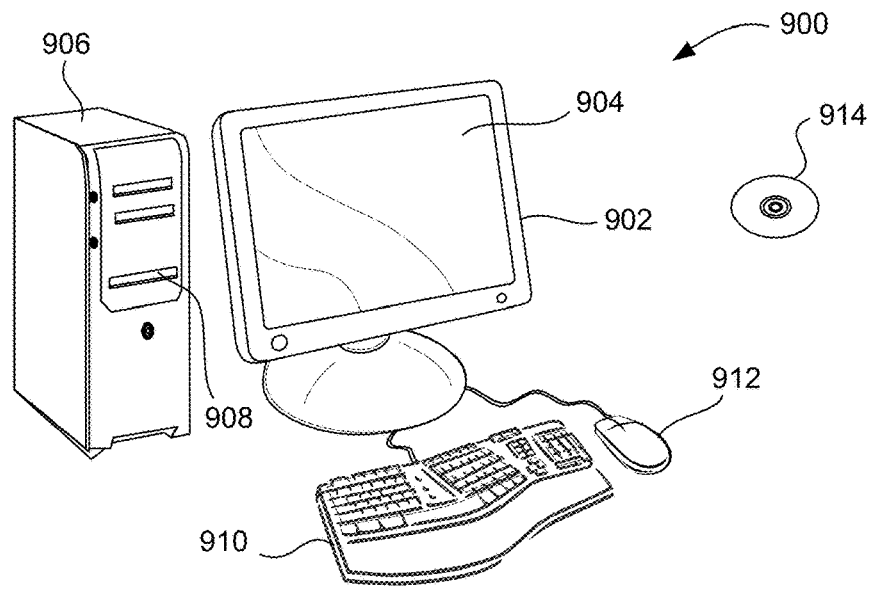
FIGS. 11A and 11B illustrate a computer system suitable for implementing embodiments of the present invention.
Figure 11B:
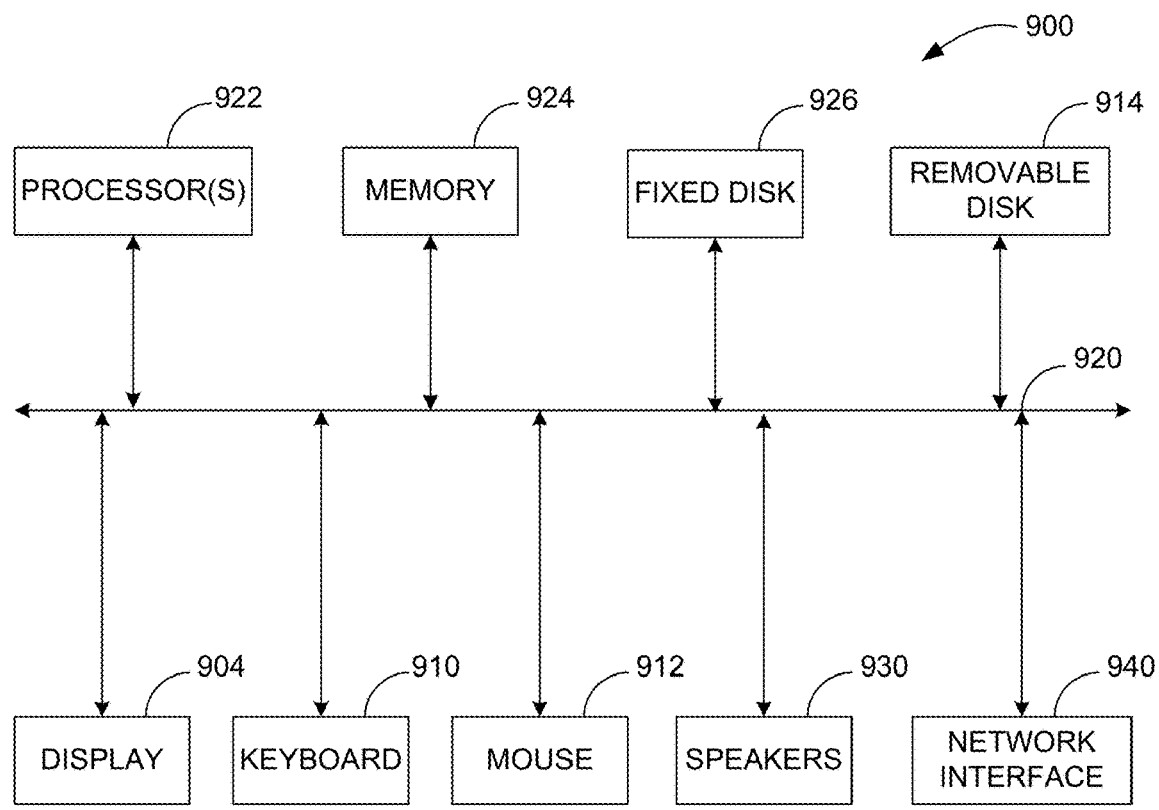

FIGS. 11A and 11B illustrate a computer system 900 suitable for implementing embodiments of the present invention. FIG. 11A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 11B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

APPENDIX A

As described above, a compiler compiles a script in a source code language into a DLL file that can be loaded and executed by a rendering engine. One alternative is to compile the script into an intermediate format and then interpret that format at runtime, but an interpreter is unlikely to meet the stringent performance goals for building reconstruction in real time during execution of an application. A second alternative is to link the generated native code into a softer application statically, but, even though statically-linking generated code is feasible, it would dramatically slow down work flow in that a full simulator or game rebuild would be needed for every minor adjustment to a script. Therefore, it is found that the following detailed implementation works well.

The script compiler reads a script written in a domain specific language (DSL) and transpiles that script into C++ code which may then be linked with the core library (containing implementations of the geometry functions used by the script) and with a module template to create a module DLL. A C++ compiler is used to generate the DLL. This module DLL exports an implementation of an abstract C++ class. Specifically, the compiler first translates scripts from the domain specific language to C++; basic operations are implemented as C++ templates which take the code that calculates their parameters in the code that processes their output as template parameters. The compiler is implemented as a multi-pass compiler. The input is converted to an abstract syntax tree (AST) using an ANTLR-based parser and then subjected to several separate compiler passes. The passes are: Parse input and convert to abstract syntax tree (AST), Link grammar modules (resolve imports, qualified names), Desugar high-level constructs and check for type errors, Check for shape type consistency, and Generate C++ code.

During execution, in order to reconstruct a particular building, the DLL module (representing a particular script) is passed a pointer to the CBOR data for an entire tile (which has been downloaded by the shape loader). The values for low-resolution data such as land classification, population density and region data are passed as a small fixed-size array (5×5 samples on a LOD 13 tile, 3×3 for LOD 14) for the entire tile. DEM information typically requires higher resolution, so the rendering engine supplies a callback function that is invoked as needed by the DLL module to query DEM height values for the building footprints taken from the CBOR. Additionally, the DLL module is passed a pointer to the contents of a configuration file in TOML format. Script input variables that are not set for individual buildings by the CBOR file are read from this file. These variables are used to control global configuration of the building grammar, such as debugging flags.

Output data from a script being executed by the grammar processor is written directly into a buffer or buffers provided by the calling program (i.e., the software application). When the supplied buffers are full, the DLL module returns to the calling program and the program can invoke the module again with new buffers. Output data consists of a vertex buffer, an index buffer and a "facade data" buffer. The vertex buffer contains vertex coordinates as well as texture identifiers and texture coordinates for two texture layers. The index buffer is filled with 16-bit indices into the vertex buffer. The facade data buffer contains additional data used by the texture grid shader in the software application to add facade details not represented in the geometry data.

Each script is implemented using a context-free deterministic shape grammar with four shape types (Rectangle, Polygon, Box and Prism) and arbitrary extensible attributes on shapes. On top of this, the grammar also provides user-defined pure functions, parametric rules and a module system. The shape grammar is inspired by the paper "Procedural Modeling of Buildings" (P. Müller et al., 2006); parametric rules in the context of context-free shape grammars were described in "Generalized Use of Non-Terminal Symbols for Procedural Modeling" (L. Krecklau et al., 2010), both of which papers are hereby Incorporated by reference.

Each shape is represented by its size (in two dimensions for rectangles and polygons, and in three dimensions for boxes and prisms), its 4×3 transformation matrix (that describes the shape's orientation and location in space as well as its local coordinate system), and, in the case of polygons and prisms, the vertices of the polygon or the prism's ground polygon in local two-dimensional coordinates.

Additionally, a script can declare an arbitrary set of variables that are stored as attributes for each shape. These include "input" variables which are initially filled from CBOR attributes of the same name Conceptually, each shape also has a label. A script consists of a set of rules that each replace a labeled shape by zero or more differently-labeled shapes by applying predefined operations to the input shape. For each building, a script is invoked on a single two-dimensional shape that represents the input. This input shape is labeled, and its attributes are set according to the parameters for the building in the CBOR input. The grammar system implemented is context-free, i.e., every rule operates only on a single shape, without having access to other shapes that might already have been generated. It is also deterministic, i.e., there is exactly one rule for each possible label.

Thus, geometry data generation always follows a pattern of hierarchical refinement. The resulting control flow can be mapped directly to regular subroutine calls, so shape labels are never explicitly represented at run time.

Of particular note are the following operations which serve for generating actual output data: DrawTexture (sets the texture to use when the shape is generated later); Generate (writes triangles corresponding to the shape to the output buffer); Load (copies the pre-modeled asset to the output buffer at the 3-D location specified by the input shape); and StandardGrid (writes data to the façade data buffer; this data is used by the rendering engine to generate a grid-like arrangement of textures without requiring additional geometry complexity). These operations are typically invoked by scripts at or near the end of the reconstruction process.

A script using the following domain specific language consists of one or more modules each stored as a file in the same directory. The main module is expected to contain the rules Test (for use in the editor) and Start (for use in the simulator or game). Each module includes three sections: import declarations; variable, texture and function declarations; and rules. These sections appear in this order and may not be mixed. Regarding import declarations, each module may declare uppercase symbol names in lowercase variable names Variable declarations may take several forms. Function declarations may be declared anywhere a variable declaration is legal and can be used anywhere an expression is required. A simple rule declaration starts with an uppercase symbol identifier followed by a colon and then ends with a semicolon. The domain specific language also includes operator invocations such as: "Discard," "Generate," "Extrude," "Scale," "Duplicate," "Switch," let operations, and if/else statements. Also included are parametric rule declarations and expressions (literals, variables, arithmetic operators, relational and Boolean operators).

A texture grid shader is a functionality of the domain specific language that allows it to define an arrangement of textures in a grid. It is designed for facades of large buildings, where windows and doors are often arranged in a grid. In the software application, this texture arrangement is rendered by the pixel shader of the graphics card, and therefore does not require any additional geometry.

An example of a facade generated with the texture grid shader may be a front face of a large building having numerous rows of windows and a single door. The texture grid thus defines a grid of rows and columns There exist normal rows and columns, and one special row and one special column because of the door at the bottom of the façade. The special row and column are used for the placement of the door and possibly different windows in that row and column. Additionally, there may be some padding on the sides and on the top of the façade The following parameters may be defined within a texture grid: height of normal rows, width of normal columns, height of special row, width of special column, width of padding on both sides, height of padding on the top, texture (e.g., window) in cells of normal rows and columns, texture (e.g. window) in special rows, texture (e.g., window) in special column, texture (e.g., door) in the one cell with special row and special column, position of the special row (bottom/middle/top/discard—usually bottom), and position of the special column (left/middle/right/discard—usually middle). There is the additional functionality in the texture grid to specify different alternatives for individual textures (e.g., for a window texture). For example, an alternative window (one with a curtain, one without, one with an object in the background, etc.) can be created, and each time the window is drawn one of these alternatives is randomly chosen.

The layout and functions of the texture grid shader are chosen as a balance between two opposing requirements: letting the texture grid model a wide variety of facades, and keeping the texture grid implementation on the pixel shader simple and performant. If other or more complex layouts are needed, geometry can simply be split by other operators into multiple sub-shapes, and in each sub-shape a smaller texture grid may be used.

APPENDIX B

In a regular script, every building begins with two Rules, one called Test and one called Start. Rules are always followed by a colon. The Test rule is usually executed by Test-mode, while the Start rule is executed by the CBOR-mode and the game itself. Every rule needs to be terminated correctly, this can be done in four different ways: Follow-up rule. This is the name of the next rule in order, for example, Start; in Test, above; Empty rule. This works like a Follow-up rule, except that this rule isn't defined. It works exactly like Generate ( ); but displays a warning. This is useful for creating placeholders; Generate ( ); This terminates the current rule and causes the current surface to be drawn; Discard ( ); This terminates the current rule and discards the current surface.

The Test rule is used to set values, usually set through CBOR files. This is useful to test one specific configuration, and the most frequently used operation within the Test rule is CreatePolygon ( ), it's coordinates are to be listed in counter-clockwise order. This operation creates a Polygon which we can work with. It is defined in the Test rule, because the Start rule takes its polygons from the CBOR's footprint data.

After this is set up, the next Operator used is usually Extrude ( ), which extrudes the footprint to a certain height, transforming the 2-Dimensional footprint into a 3-Dimensional object. To effectively edit shapes, they need to be 2-Dimensional, so we have to break the resulting 3-Dimensional shape up into its faces again. To accomplish that, we use the CompSplit ( ) operator. The CompSplit ( ) operator splits the shape it is applied on into three parts: top, mantle and bottom. Every one of these parts needs to be followed and/or terminated by another Rule. All three parts need to be listed for the operation to be legal: top is the top (Z+) side of the 3D shape. This can be a Quad or a Polygon, depending on the original shape that was extruded. This is a good place to place a Roof, for example a RoofGabled ( ); bottom is the bottom (Z−) side of the 3D shape. This can also be a Quad or a Polygon, depending on the original shape. To save on geometry, it is usually a good idea to terminate faces that would not be visible anyway with a Discard ( ) operator; and mantle contains all of the faces that are not covered by bottom and top. Mantle's faces usually are Quads.

Operations executed from mantle polygons are applied to all the mantle's polygons. These can be sorted, and addressed individually using the output ID. The RoofGabled ( ) operator creates a gabled roof. It is continued by top and mantle parts, similar to the CompSplit ( ) operator. An If ( ) operator can be used to make a decision between two states. If more than two states are needed, using a Switch ( ) or ChooseFirstPath ( ) operator are recommended. An If ( ) operator requires an Else statement.

The faces, resulting from a CompSplit ( ) operation usually are partitioned into smaller pieces. This is useful for placing texture and geometry assets, and the operators used here SubDiv ( ) and Repeat ( ). The SubDiv ( ) operation takes an axis of the currently edited face. +X is always the local horizontal axis, while +Y always describes the vertical. SubDiv ( ) has to be followed by curly brackets, that contain the size of the single subdivisions, which can be positive to reflect absolute values, or negative to set proportional sizes. One example applies the rule Door to a segment with a width of 2.5, that would be centered on a wall. If the wall is less than 2.5 wide, the Door rule is not executed. Another example applies the rule Door to a segment that encompasses a fourth of the wall. It would always be a fourth of the wall, regardless of the wall's width. Both examples would encompass all of the height of that particular wall, which could be split into segments, using either SubDiv ( ) or Repeat ( ) with the +Y axis in combination.

The Repeat ( ) operation takes an axis, followed by a size. The currently active face is then split by how ever many times this size fits the face. Repeat ( ) being used without a SubDiv ( ) tends to cause holes, due to the lack of proportional parts that fill the segments that are too small to contain a complete step of the repeated instructions. Repeat ( ) always repeats the rules that follow it. Another example is a SubDiv ( ) that separates a 3.0 high ground floor from the rest of the building (−1) which is then filled up with as many floors the size of 3.0 that will fit it. Textures are loaded from a texture array, and are identified with a string, currently corresponding to the original file name of the texture.

APPENDIX C

CGL (Compressed Geo-data Library) is container file format inspired by the BGL file format from FSX. CGL files fulfill these needs: it is a general purpose container file format; it stores data bound to a certain location on the earth; it stores data in multiple levels of detail; the CGL files themselves are named and organized on disk in a consistent way—the location for which information is needed can be easily transformed to the file location and name; within a CGL file data can be searched by location; the data structure and the contents of the CGL files are represented in compact binary form to save as much space as possible.

A flight simulator or game organizes the game, the rendering of the planet, the loading of data, etc., around a tile system that has the same properties as the tile system used by Bing Maps, OpenStreetMap and Google Maps. The tile system is based on a Mercator projection where the whole world is mapped to a single square. This projection space is then split up into smaller squares. Each increasing LOD (level of detail) level has four times as many tiles as the level before. For a good introduction on the tiling system and quadkeys, information may be found on the Microsoft Web site. Since a game organizes itself around these tiles, it makes sense to store information associated with the planet also in a tile-based addressing scheme.

A prior art flight simulator, FSX, has a similar scheme; however, that scheme is not based on a square Mercator projection, but rather on the rectangular QMID addressing scheme system. It is undesirable to use QMID for all types of data; the main reason for this is that the QMID tiles are not congruent with the Bing tiles. Another problem are the different LOD levels and resolutions at these LOD levels. Our approach uses a container file that is based and organized around the Bing tile system.

This container file has the following properties: addressing scheme based on the Bing tile quadkeys files are quickly found on disk; the contents of a container are organized in Bing tiles; it supports multiple LODs; it is space efficient. We organize offline data in a directory structure that follows LOD 3. This means we have 64 directories on disk, which are identified by their quadtree code (from 000 to 333).

Using an example quadkey of 02123003200201, the directory consists of the first 3 characters, 021. We encapsulate data in CGL files, one per tile in LOD 6. This amounts to 64 files per directory at maximum. So, in our example quadkey of 02123003200201, the LOD 6 part of the name is 021230. Instead of storing the full quadkey of 021230, the file is only named 230, since the quadkey prefix, 021, can be inferred by the directory. The data itself resides in a CGL file at a LOD >=6. There are different CGL files per data category. This means that there are CGL files for vector data, CGL files for building data and so on. The prefix of the name of the CGL file distinguishes the category of the data (e.g., CGLs with prefix "vec" hold vector data). Thus, in a single directory, there might be multiple CGL files for the same tile, with the same quadkey but different prefixes. All in all, this gives us a maximum of 64 directories*64 files=4096 files per file type.

There are special CGL files which are stored on LOD 0 and include tiles for the whole world. Currently there are two of those files, the Landclassification/Region/Population and the Texture Synthesis Mask file. The Land classification stores tiles on LOD 8 within the CGL file. The quadkey is encoded in either 16 or 32 bit. The encoding is defined in a section header. Only the first quadkey is stored normally, all other quadkeys are stored as a difference to the quadkey before. The bit depth (16 or 32 bit) stays the same. The subsection size is also stored as a difference to the subsection size before. If the difference fits in 15 bits then 16 bits are stored (with MSB=0). If it does not fit in 16 bits it is stored as 31 bits with the MSB set to 1. The uncompressed size is 0 in case the data is uncompressed. If the data is compressed (that will be in most cases) the uncompressed size is stored as the difference to the compressed size. If it fits in 15 bits, it will be stored as 16 bits with the MSB=0. If it does not fit in 16 bits it will be stored as 31 bits with the MSB set to 1. To get a better compression ratio the subsection header data is stored in columns. This means that all the quadkeys are stored as a list first, followed by the list of sizes followed by the list of all uncompressed sizes.

To save size, the quadkey of the subsections are stored in "compressed" manner: since all subsections are in the same LOD 8 tile that the CGL file spans, these common leading quadkey bits are omitted. So for example the file \0212\vec0333.cgl will only hold tiles that have 02120333 as start of the quadkey, e.g., 021203331230. So, when encoding this quadkey, we only need to store the suffix of "1230" since 02120333 is give by the file itself. Additional to the quadkey, we store the LOD, which is 12 for this file. However, since all tiles in the file 02120333 should be at LOD 8 or higher, we only need to store it as LOD 8. The LOD is encoded in the first 4 bits, giving 12 or 28 bits for the remaining quadkey.

Also, note that within one section header the quadkey size should be the same (2 or 4 bytes). The third encoding type for 16-bit quadkey assumes all tiles within the subsections to be on the same LOD. Therefore the LOD does not need to be stored (it is stored in the section header). This is being used for building metadata which is stored on LOD 14, the CGL file is on LOD 6, resulting in a relative quadkey of 8 LODS, which can be stored within 16 bits without the LOD. The contents of subsections and the subsection headers array itself can be stored in compressed form. This is indicated by the MSB of the size being one. In that case the remaining size (without the MSB) is the compressed size. This size is then loaded from disk and decompressed in memory. A compression algorithm LZMA is used. These types of data are currently stored in CGL files: vector data; digital elevation data; land classification data population density data; cultural region information; building metadata.

We claim:

1. In a server computer, a method of reconstructing a building, said method comprising:
   inputting a two-dimensional (2-D) aerial image that includes an image of a building;
   producing a shape file based upon said 2-D aerial image, said shape file including a footprint of said building;
   compiling a script program into a compiled script code program, said compiled script code program arranged to generate a three-dimensional (3-D) textured mesh of a building type that reconstructs said building when executed, wherein said compiled script code program describes how to reconstruct buildings having said building type;
   transmitting said compiled script code program to a client computer;
   in response to a request from a software application on said client computer, transmitting said shape file to said client computer;
   classifying, on said client computer, said building footprint of said shape file as said building type;
   identifying said compiled script code program out of a plurality of compiled script code programs on said client computer using said classified building type and said building type of said compiled script code program;
   requesting, by said client computer, said compiled script code program corresponding to said identified compiled script code program; and
   executing said compiled script code program on said client computer and generating said 3-D textured mesh of said building type using said building footprint of said shape file.

2. A method as recited in claim 1 wherein said shape file includes land use type data pertaining to a region of said building where said building footprint is found, said method further comprising:
   said executing compiled script code also using said land use type data in order to generate said 3-D textured mesh of said building having dimensions consistent with said included land use type data.

3. A method as recited in claim 1 wherein said request from said software application on said client computer is for said shape file including said footprint of said building in view of an avatar in said software application, said method further comprising:
   performing said downloading of said shape file in real time.

4. A method as recited in claim 1 further comprising:
   downloading said compiled script code from said server computer in real time in response to a request from said software application.

5. A method as recited in claim 1 wherein said compiled script code is further arranged to generate said 3-D textured mesh of said building using a level of detail that depends upon a distance from a location of an avatar to said building in said software application.

6. A method as recited as in claim 1, whereby a rendering engine displays on said client computer a two-dimensional (2-D) representation of said building using said 3-D textured mesh.

7. A method as recited in claim 1 wherein said method occurs on said server computer and on said client computer, said method further comprising:
   executing said compiled script code on said client computer and generating said 3-D textured mesh of said building type using said building footprint of said shape file.

8. A method as recited in claim 1 wherein said request from said software application on said client computer is for a shape file including said footprint of said building in view of an avatar in said software application, said method further comprising:
   displaying using a rendering engine on said client computer a two-dimensional (2-D) representation of said building using said 3-D textured mesh, wherein said 2-D representation of said building is as seen from a location of said avatar in said software application.

9. A system for reconstructing a building, said system comprising:
   a two-dimensional (2-D) aerial image on a server computer that includes an image of a building;
   a shape file on a client computer based upon said 2-D aerial image, said shape file including a footprint of said building;
   a compiler on said server computer arranged to compile a plurality of script programs each into compiled script code, wherein each script program describes how to reconstruct a building having a particular building type;
   a script loader on said client computer that downloads said plurality of compiled script codes to said client computer;
   a classifier on said client computer that classifies said building footprint as a type of building, wherein said classifier further identifies one of said script programs out of said plurality of script programs on said client computer using said classified building type and said building type of said one of said script programs, and requests said compiled script code corresponding to said identified one of said script programs;

a processor on said client computer that executes said compiled script code to generate a three-dimensional (3-D) textured mesh of said building type that reconstructs said building using said building footprint of said shape file; and a rendering engine on said client computer arranged to input said 3-D textured mesh and to display on said client computer a two-dimensional (2-D) representation of said building.

10. A system as recited in claim 9 wherein said shape file includes land use type data pertaining to a region of said building where said building footprint is found, and wherein said executing compiled script code also using said land use type data in order to generate said 3-D textured mesh of said building having dimensions consistent with said included land use type data.

11. A system as recited in claim 9 wherein said client computer is arranged to send a request from said software application for said shape file including said footprint of said building in view of an avatar in said software application, and wherein said client computer is further arranged to download said shape file in real time from said server computer.

12. A system as recited in claim 9 wherein said compiled script code is downloaded from said server computer in real time to said client computer.

13. A system as recited in claim 9 wherein said compiled script code is further arranged to generate said 3-D textured mesh of said building using a level of detail that depends upon a distance from a location of an avatar to said building in said software application.

14. A system as recited in claim 9 wherein said 2-D representation of said building is as seen from a location of an avatar in said software application.

15. A system as recited in claim 9 wherein said client computer is further arranged to send a request from said software application for said shape file including said footprint of said building in view of an avatar in said software application, and to display using a rendering engine on said client computer a two-dimensional (2-D) representation of said building using said 3-D textured mesh, wherein said 2-D representation of said building is as seen from a location of said avatar in said software application.

16. In a server computer, a method of reconstructing a building, said method comprising:
inputting a two-dimensional (2-D) aerial image that includes an image of a building;
producing a shape file based upon said 2-D aerial image, said shape file including a footprint of said building;
compiling a plurality of script programs each into compiled script code, said each compiled script code arranged to generate a three-dimensional (3-D) textured mesh of a building type that reconstructs said building type when executed;
in response to a request from a software application on said client computer, transmitting said shape file to said client computer;
classifying, on said client computer, said building footprint of said shape file as a building type;
identifying, on said client computer, one of said script programs out of said plurality of script programs using said classified building type and said building type of said one of said script programs;
requesting, by said client computer, and transmitting from said server computer, said compiled script code to said client computer that corresponds to said identified script program; and
executing said compiled script code on said client computer and generating said 3-D textured mesh of said building type using said building footprint of said shape file.

17. A method system as recited in claim 16 further comprising:
transmitting said plurality of compiled script codes to said client computer before said identifying.

18. A system for reconstructing a building, said system comprising:
a two-dimensional (2-D) aerial image on a server computer that includes an image of a building;
a shape file on a client computer based upon said 2-D aerial image, said shape file including a footprint of said building;
a compiler on said server computer arranged to compile a plurality of script programs each into compiled script code, said each compiled script code arranged to generate a three-dimensional (3-D) textured mesh of a building type that reconstructs said building type when executed;
a classifier on said client computer that classifies said building footprint as a type of building and identifies one of said script programs out of said plurality of script programs using said classified building type and said building type of said one of said script programs;
a script loader on said client computer that loads said compiled script code to said client computer that corresponds to said identified script program;
a processor on said client computer that executes said compiled script code to generate a three-dimensional (3-D) textured mesh of said building type that reconstructs said building using said building footprint of said shape file; and
a rendering engine arranged to input said 3-D textured mesh and to display on said client computer a two-dimensional (2-D) representation of said building.

19. A system as recited in claim 18 wherein said script loader on said client computer downloads said compiled script codes to said client computer before said identifying.

* * * * *